United States Patent
Papasakellariou

(10) Patent No.: US 12,225,549 B2
(45) Date of Patent: Feb. 11, 2025

(54) TIMELINES AND CONDITIONS FOR TRANSMISSION OF ACKNOWLEDGMENT INFORMATION

(71) Applicant: Samsung Electronics Co., Ltd., Suwon-si (KR)

(72) Inventor: Aris Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 300 days.

(21) Appl. No.: 17/929,639

(22) Filed: Sep. 2, 2022

(65) Prior Publication Data

US 2023/0087510 A1 Mar. 23, 2023

Related U.S. Application Data

(60) Provisional application No. 63/246,480, filed on Sep. 21, 2021.

(51) Int. Cl.
*H04W 72/23* (2023.01)
*H04L 1/1829* (2023.01)
*H04W 72/30* (2023.01)

(52) U.S. Cl.
CPC ........... *H04W 72/23* (2023.01); *H04L 1/1854* (2013.01); *H04W 72/30* (2023.01)

(58) Field of Classification Search
CPC .... H04W 72/23; H04W 72/30; H04L 1/1854; H04L 1/1664
See application file for complete search history.

(56) References Cited

U.S. PATENT DOCUMENTS

| 11,171,746 B2* | 11/2021 | Xiong ................... H04L 1/1819 |
| 11,411,793 B2* | 8/2022 | Papasakellariou ........................... H04W 72/0453 |
| 2015/0327226 A1* | 11/2015 | Cheng ................... H04L 5/0044 370/329 |

(Continued)

OTHER PUBLICATIONS

International Search Report and Written Opinion issued Jan. 2, 2023 regarding International Application No. PCT/KR2022/014069, 7 pages.

(Continued)

*Primary Examiner* — Mounir Moutaouakil

(57) ABSTRACT

Methods and apparatuses for providing hybrid automatic repeat request acknowledgement (HARQ-ACK) information. A method includes receiving a first physical downlink control channel (PDCCH) that schedules a transmission of a physical uplink shared channel (PUSCH) in a slot and receiving PDCCHs that schedule receptions of first multicast physical downlink shared channels (PDSCHs), respectively. A first number of the PDCCHs is not received after the first PDCCH, and a second number of the PDCCHs is received after the first PDCCH. The method further includes determining that transmission of a PUCCH to provide the HARQ-ACK information associated with receptions of multicast PDSCHs, that include the first multicast PDSCHs, would overlap in time with the PUSCH transmission in the slot and transmitting the PUSCH. The PUSCH includes first HARQ-ACK information associated with the first number of PDCCHs and does not include second HARQ-ACK information associated with the second number of PDCCHs.

20 Claims, 12 Drawing Sheets

(56) References Cited

U.S. PATENT DOCUMENTS

| | | | |
|---|---|---|---|
| 2018/0249458 A1* | 8/2018 | He | H04L 5/0055 |
| 2019/0289622 A1* | 9/2019 | Chatterjee | H04W 72/20 |
| 2020/0007296 A1 | 1/2020 | Papasakellariou | |
| 2021/0014647 A1 | 1/2021 | Takeda et al. | |
| 2021/0136565 A1* | 5/2021 | Saber | H04W 8/22 |
| 2022/0279504 A1* | 9/2022 | Ko | H04W 72/21 |

OTHER PUBLICATIONS

NTT DOCOMO, INC., "Discussion on mechanisms to improve reliability for multicast for RRC_CONNECTED UEs", 3GPP TSG-RAN WG1 #106-e, R1-2107882, Aug. 2021, 8 pages.

Convida Wireless, "Discussion on reliability enhancement for RRC_CONNECTED UEs", 3GPP TSG-RAN WG1#106-e, R1-2108027, Aug. 2021, 4 pages.

Huawei et al., "Mechanisms to improve reliability for RRC_CONNECTED UEs", 3GPP TSG RAN WG1 #106-e, R1-2106439, Aug. 2021, 7 pages.

Vivo, "Discussion on mechanisms to improve reliability for RRC_CONNECTED UEs", 3GPP TSG RAN WG1 #106-e, R1-2106624, Aug. 2021, 8 pages.

"3rd Generation Partnership Project; Technical Specification Group Radio Access Network; NR; Physical channels and modulation (Release 16)", 3GPP TS 38.211 V16.6.0, Jun. 2021, 134 pages.

"3rd Generation Partnership Project; Technical Specification Group Radio Access Network; NR; Multiplexing and channel coding (Release 16)", 3GPP TS 38.212 V16.6.0, Jun. 2021, 153 pages.

"3rd Generation Partnership Project; Technical Specification Group Radio Access Network; NR; Physical layer procedures for control (Release 16)", 3GPP TS 38.213 V16.6.0, Jun. 2021, 187 pages.

"3rd Generation Partnership Project; Technical Specification Group Radio Access Network; NR; Physical layer procedures for data (Release 16)", 3GPP TS 38.214 V16.6.0, Jun. 2021, 172 pages.

"3rd Generation Partnership Project; Technical Specification Group Radio Access Network; NR; Medium Access Control (MAC) protocol specification (Release 16)", 3GPP TS 38.321 V16.5.0, Jun. 2021, 157 pages.

"3rd Generation Partnership Project; Technical Specification Group Radio Access Network; NR; Radio Resource Control (RRC) protocol specification (Release 16)", 3GPP TS 38.331 V16.5.0, Jun. 2021, 964 pages.

Extended European Search Report issued Nov. 7, 2024 regarding Application No. 22873163.4, 9 pages.

Vivo, "Enhancement for Scheduling/HARQ", 3GPP TSG RAN WG1 #102-e, R1-2005350, Aug. 2020, 8 pages.

* cited by examiner

TIMELINES AND CONDITIONS FOR TRANSMISSION OF ACKNOWLEDGMENT INFORMATION

CROSS-REFERENCE TO RELATED APPLICATION AND CLAIM OF PRIORITY

This application claims priority under 35 U.S.C. § 119(e) to U.S. Provisional Patent Application No. 63/246,480 filed on Sep. 21, 2021. The above-identified provisional patent applications are hereby incorporated by reference in their entirety.

TECHNICAL FIELD

The present disclosure relates generally to wireless communication systems and, more specifically, the present disclosure relates to timelines and conditions for reporting acknowledgment information associated with multicast communications.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

This disclosure relates to timelines and conditions for transmission of acknowledgment information.

In one embodiment, a method for providing hybrid automatic repeat request acknowledgement (HARQ-ACK) information is provided. The method includes receiving a first physical downlink control channel (PDCCH) that schedules a transmission of a physical uplink shared channel (PUSCH) in a slot and receiving PDCCHs that schedule receptions of first multicast physical downlink shared channels (PDSCHs), respectively. A first number of the PDCCHs is not received after the first PDCCH, and a second number of the PDCCHs is received after the first PDCCH. The method further includes determining that a transmission of a physical uplink control channel (PUCCH) to provide the HARQ-ACK information associated with receptions of multicast PDSCHs, that include the first multicast PDSCHs, would overlap in time with the PUSCH transmission in the slot and transmitting the PUSCH. The PUSCH includes first HARQ-ACK information associated with the first number of PDCCHs. The PUSCH does not include second HARQ-ACK information associated with the second number of PDCCHs.

In another embodiment, a user equipment (UE) is provided. The UE includes a transceiver configured to receive a first PDCCH that schedules a transmission of a PUSCH transmission in a slot and receive PDCCHs that schedule receptions of first multicast PDSCHs, respectively. A first number of the PDCCHs is not received after the first PDCCH, and a second number of the PDCCHs is received after the first PDCCH. The UE further includes a processor operably coupled to the transceiver. The processor is configured to determine that a transmission of a PUCCH to provide HARQ-ACK information associated with receptions of multicast PDSCHs, that include the first multicast PDSCHs, would overlap in time with the PUSCH transmission in the slot. The transceiver is further configured to transmit the PUSCH. The PUSCH includes first HARQ-ACK information associated with the first number of PDCCHs. The PUSCH does not include second HARQ-ACK information associated with the second number of PDCCHs.

In yet another embodiment, a base station is provided. The base station includes a transceiver configured to transmit a first PDCCH that schedules a reception of a PUSCH in a slot, and transmit PDCCHs that schedule transmissions of multicast PDSCHs, respectively. A first number of the PDCCHs is not transmitted after the first PDCCH, and a second number of the PDCCHs is transmitted after the first PDCCH. The base station further includes a processor operably coupled to the transceiver. The processor is configured to determine that a reception of a PUCCH to provide HARQ-ACK information associated with transmissions of multicast PDSCHs, that include the first multicast PDSCHs, would overlap in time with the PUSCH reception in the slot. The transceiver is further configured to receive the PUSCH. The PUSCH includes first HARQ-ACK information associated with the first number of PDCCHs. The PUSCH does not include second HARQ-ACK information associated with the second number of PDCCHs.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
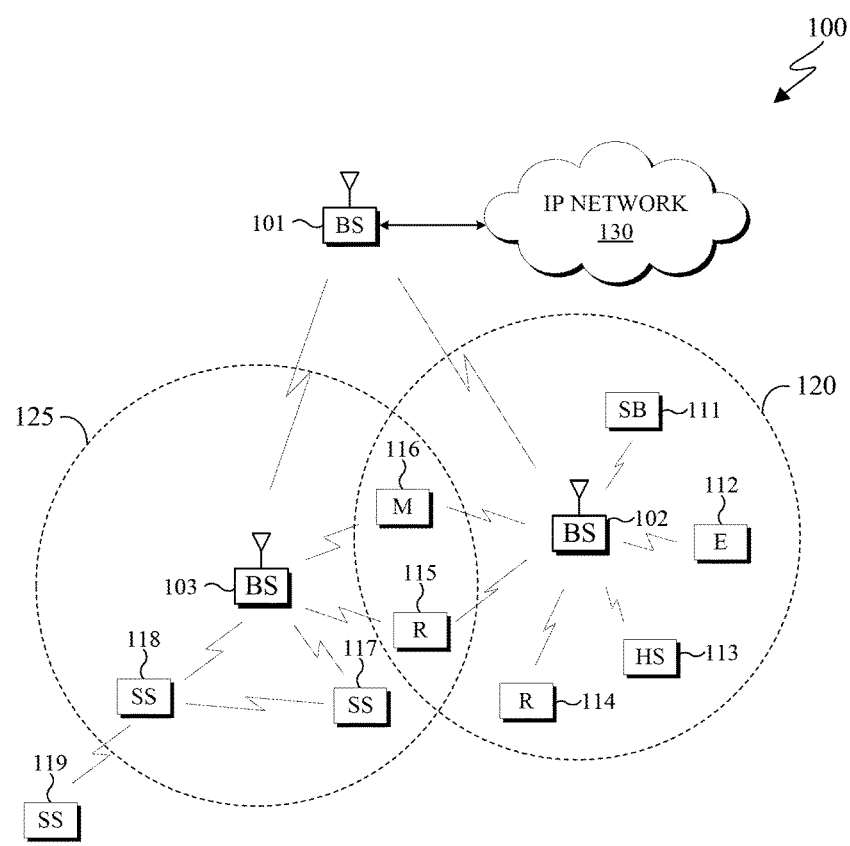
FIG. 1 illustrates an example wireless network according to embodiments of the present disclosure.

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

The following documents are hereby incorporated by reference into the present disclosure as if fully set forth herein: 3GPP TS 38.211 v16.6.0, "NR; Physical channels and modulation" ("REF1"); 3GPP TS 38.212 v16.6.0, "NR; Multiplexing and Channel coding" ("REF2"); 3GPP TS 38.213 v16.6.0, "NR; Physical Layer Procedures for Control" ("REF3"); 3GPP TS 38.214 v16.6.0, "NR; Physical Layer Procedures for Data" ("REF4"); 3GPP TS 38.321 v16.5.0, "NR; Medium Access Control (MAC) protocol specification" ("REF5"); and 3GPP TS 38.331 v16.5.0, "NR; Radio Resource Control (RRC) Protocol Specification" ("REF6").

Certain embodiments of the present disclosure relate generally to wireless communication systems and, more specifically, to determining timelines and conditions for transmission of a physical uplink control channel (PUCCH) transmission with unicast or with multicast hybrid automatic repeat request (HARQ)—acknowledgement (ACK) information from a user equipment (UE) to a base station.

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage are of paramount importance.

To meet the demand for wireless data traffic having increased since deployment of the fourth generation (4G) communication systems, efforts have been made to develop and deploy an improved 5th generation (5G) or pre-5G/NR communication system. Therefore, the 5G or pre-5G communication system is also called a "beyond 4G network" or a "post long term evolution (LTE) system."

The 5G communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Depending on the network type, the term 'base station' (BS) can refer to any component (or collection of components) configured to provide wireless access to a network, such as transmit point (TP), transmit-receive point (TRP), an enhanced base station (eNodeB or eNB), a gNB, a macrocell, a femtocell, a WiFi access point (AP), a satellite, or other wirelessly enabled devices. Base stations may provide wireless access in accordance with one or more wireless communication protocols, e.g., 5G 3GPP New Radio Interface/Access (NR), LTE, LTE advanced (LTE-A), High Speed Packet Access (HSPA), Wi-Fi 802.11a/b/g/n/ac, etc. The terms 'BS,' 'gNB,' and 'TRP' can be used interchangeably in this disclosure to refer to network infrastructure components that provide wireless access to remote terminals. Also, depending on the network type, the term 'user equipment' (UE) can refer to any component such as mobile station, subscriber station, remote terminal, wireless terminal, receive point, vehicle, or user device. For example, a UE could be a mobile telephone, a smartphone, a monitoring device, an alarm device, a fleet management device, an asset tracking device, an automobile, a desktop computer, an entertainment device, an infotainment device, a vending machine, an electricity meter, a water meter, a gas meter, a security device, a sensor device, an appliance, and the like. For the sake of convenience, the terms "user equipment" and "UE" are used in this patent document to refer to remote wireless equipment that wirelessly accesses an gNB, whether the UE is a mobile device (such as a mobile telephone or smartphone) or is normally considered a stationary device (such as a desktop computer or vending machine). The UE may also be a car, a truck, a van, a drone, or any similar machine or a device in such machines.

Figure 2:
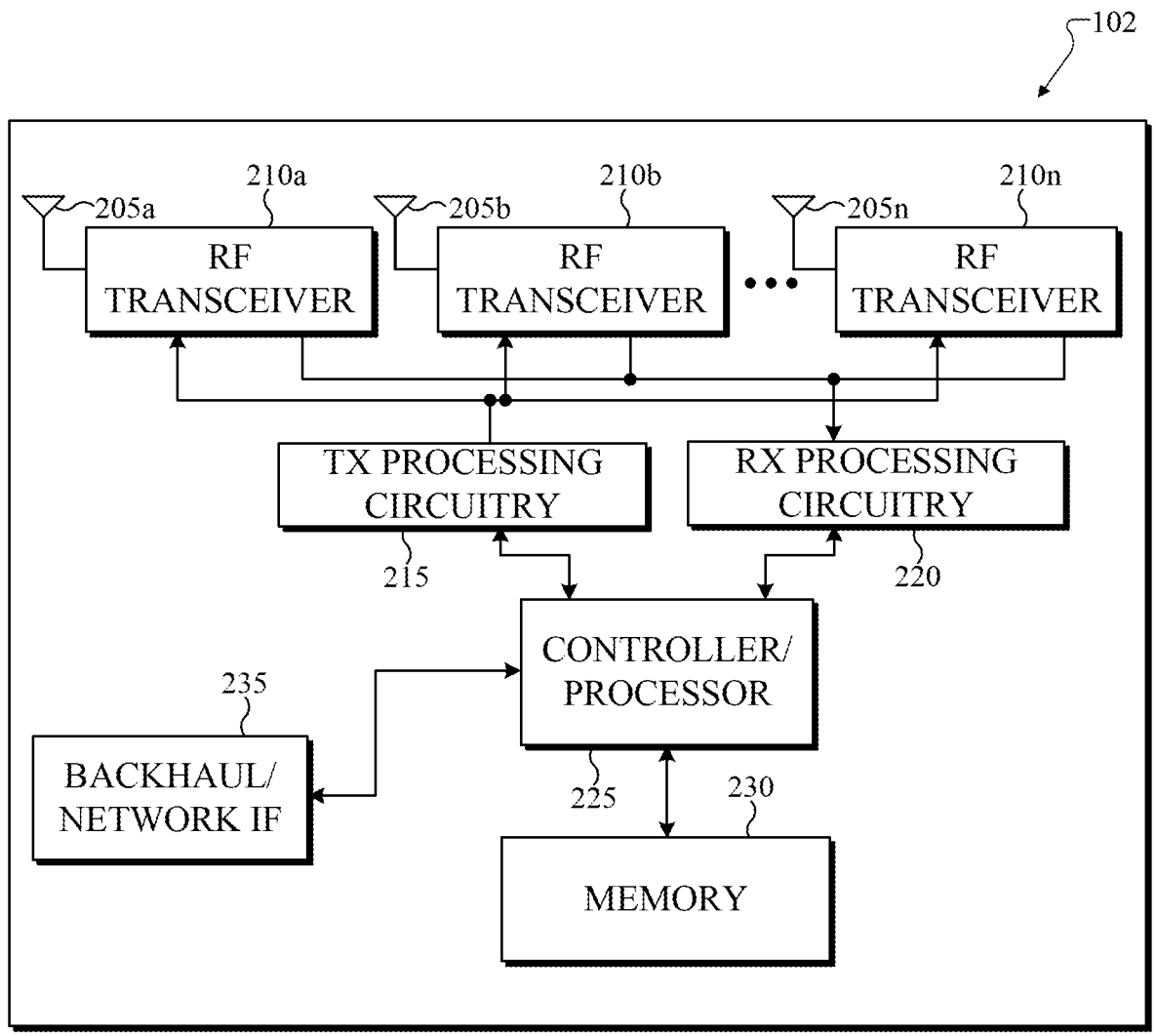
FIG. 2 illustrates an example base station (BS) according to embodiments of the present disclosure.
Figure 3:
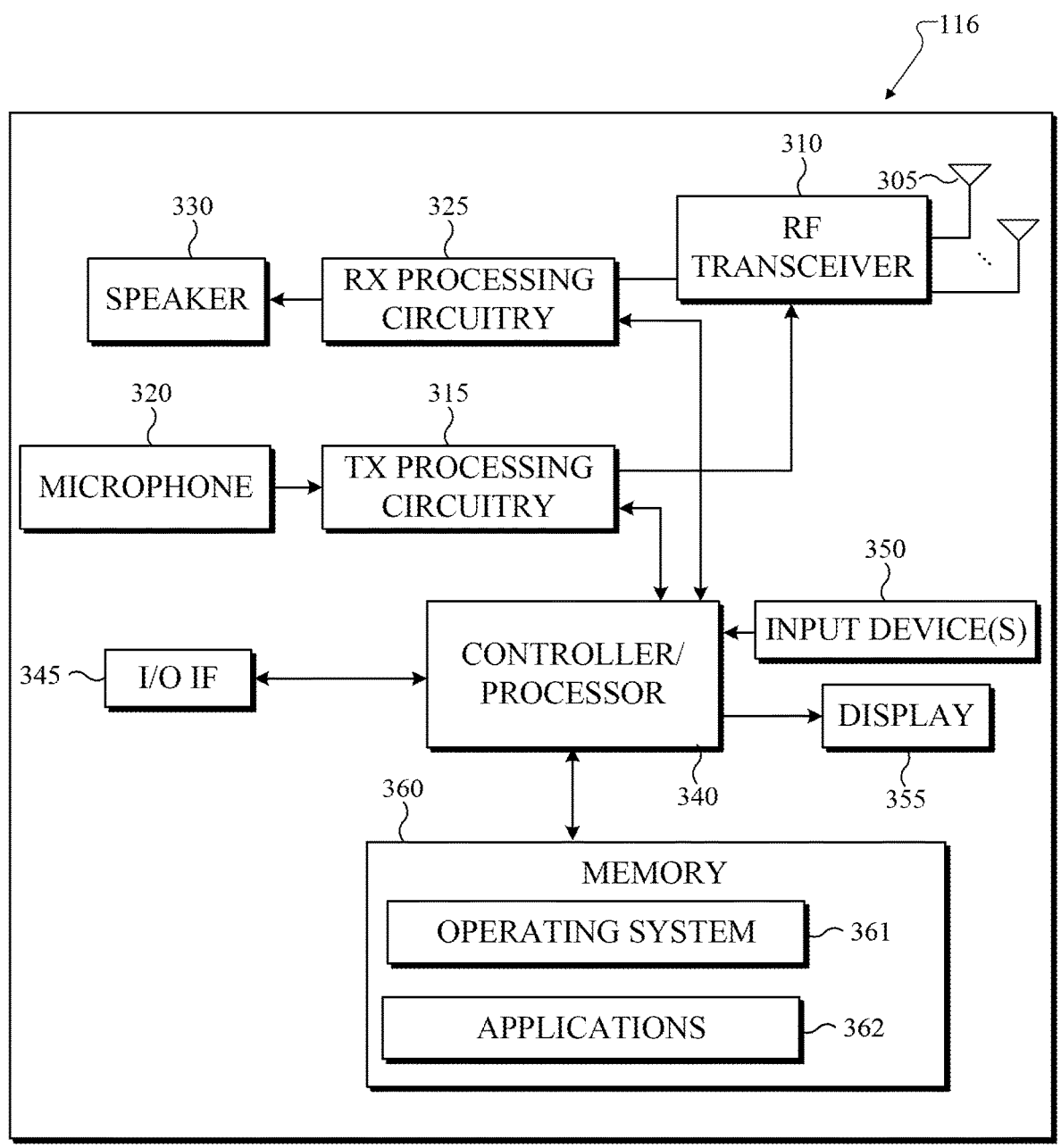
FIG. 3 illustrates an example user equipment (UE) according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network 100 according to embodiments of the present disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes various gNodeB (gNB) such a base station, BS 101, a BS 102, and a BS 103. The BS 101 communicates with the BS 102 and the BS 103. The BS 101 also communicates with at least one network 130, such as the Internet, a proprietary Internet Protocol (IP) network, or other data network.

The BS 102 provides wireless broadband access to the network 130 for a first plurality of user equipment's (UEs) within a coverage area 120 of the BS 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The BS 103 provides wireless broadband access to the network 130 for a second plurality of UEs within a coverage area 125 of the BS 103. The second plurality of UEs includes the UE 115, the UE 116, the UE 117, and the UE 118. In some embodiments, one or more of the BSs 101-103 may communicate with each other and with the UEs 111-118 using 5G/NR, long term evolution (LTE), long term evolution-advanced (LTE-A), WiMAX, WiFi, or other wireless communication techniques.

In certain embodiments, multiple UEs (such as the UE 117, the UE 118, and the UE 119) may communicate directly with each other through device-2-device communication. In some embodiments, a UE, such as UE 119, is outside the coverage area of the network, but can communicate with other UEs inside the coverage area of the network, such as UE 118, or outside the coverage area of the network.

Dotted lines show the approximate extents of the coverage areas 120 and 125, which are shown as approximately circular for the purposes of illustration and explanation only. It should be clearly understood that the coverage areas associated with BSs, such as the coverage areas 120 and 125, may have other shapes, including irregular shapes, depending upon the configuration of the BSs and variations in the radio environment associated with natural and man-made obstructions.

As described in more detail below, one or more of BS 101, BS 102 and BS 103 include conditions and timelines for transmission of acknowledgment information as described in embodiments of the present disclosure. In some embodiments, one or more of BS 101, BS 102 and BS 103 conditions and timelines for transmission of acknowledgment information. Additionally, as described in more detail below, one or more of the UEs 111-119 include circuitry, circuitry, programing, or a combination thereof for conditions and timelines for transmission of acknowledgment information. In certain embodiments, and one or more of the BSs 101-103 includes circuitry, programing, or a combination thereof for conditions and timelines for transmission of acknowledgment information.

Although FIG. 1 illustrates one example of a wireless network, various changes may be made to FIG. 1. For example, the wireless network could include any number of BSs and any number of UEs in any suitable arrangement. Also, the BS 101 could communicate directly with any number of UEs and provide those UEs with wireless broadband access to the network 130. Similarly, each BS 102-103 could communicate directly with the network 130 and provide UEs with direct wireless broadband access to the network 130. Further, the BSs 101, 102, and/or 103 could provide access to other or additional external networks, such as external telephone networks or other types of data networks.

FIG. 2 illustrates an example BS 102 according to embodiments of the present disclosure. The embodiment of the BS 102 illustrated in FIG. 2 is for illustration only, and the BSs 101 and 103 of FIG. 1 could have the same or similar configuration. However, BSs come in a wide variety of configurations, and FIG. 2 does not limit the scope of this disclosure to any particular implementation of a BS.

As shown in FIG. 2, the BS 102 includes multiple antennas 205a-205n, multiple radio frequency (RF) transceivers 210a-210n, transmit (TX) processing circuitry 215, and receive (RX) processing circuitry 220. The BS 102 also includes a controller/processor 225, a memory 230, and a backhaul or network interface 235.

The RF transceivers 210a-210n receive, from the antennas 205a-205n, incoming RF signals, such as signals transmitted by UEs in the wireless network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the BS 102. For example, the controller/processor 225 could control the reception of uplink channel signals and the transmission of downlink channel signals by the RF transceivers 210a-210n, the RX processing circuitry 220, and the TX processing circuitry 215 in accordance with well-known principles. The controller/processor 225 could support additional functions as well, such as more advanced wireless communication functions. Any of a wide variety of other functions could be supported in the BS 102 by the controller/processor 225. In some embodiments, the controller/processor 225 includes at least one microprocessor or microcontroller.

The controller/processor 225 is also capable of executing programs and other processes resident in the memory 230, such as an OS. The controller/processor 225 can move data into or out of the memory 230 as required by an executing process. For example, the controller/processor 225 can move data into or out of the memory 230 according to a process that is being executed.

The controller/processor 225 is also coupled to the backhaul or network interface 235. The backhaul or network interface 235 allows the BS 102 to communicate with other devices or systems over a backhaul connection or over a network. The network interface 235 could support communications over any suitable wired or wireless connection(s). For example, when the BS 102 is implemented as part of a cellular communication system (such as one supporting 5G/NR, LTE, or LTE-A), the network interface 235 could allow the BS 102 to communicate with other BSs over a wired or wireless backhaul connection. When the BS 102 is implemented as an access point, the network interface 235 could allow the BS 102 to communicate over a wired or wireless local area network or over a wired or wireless connection to a larger network (such as the Internet). The network interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

As described in more detail below, the transmit and receive paths of the BS 102 (implemented using the RF transceivers 210a-210n, TX processing circuitry 275, and/or RX processing circuitry 270) support communication with aggregation of frequency division duplex (FDD) cells and time division duplex (TDD) cells.

Although FIG. 2 illustrates one example of BS 102, various changes may be made to FIG. 2. For example, the BS 102 could include any number of each component shown in FIG. 2. As a particular example, an access point could include a number of network interfaces 235, and the controller/processor 225 could support routing functions to route data between different network addresses. As another particular example, while shown as including a single instance of TX processing circuitry 215 and a single instance of RX processing circuitry 220, the BS 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 and 117-119 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a RF transceiver 310, TX processing circuitry 315, a microphone 320, and receive (RX) processing circuitry 325. The UE 116 also includes a speaker 330, a processor 340, an input/output (I/O) interface (IF) 345, an input device 350, a display 355, and a memory 360. The memory 360 includes an operating system (OS) 361 and one or more applications 362.

The RF transceiver 310 receives, from the antenna 305, an incoming RF signal transmitted by a BS of the wireless network 100. The RF transceiver 310 down-converts the incoming RF signal to generate an intermediate frequency (IF) or baseband signal. The IF or baseband signal is sent to the RX processing circuitry 325 that generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of uplink channel signals and the transmission of downlink channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from BSs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input device 350. The operator of the UE 116 can use the input device 350 to enter data into the UE 116. The input device 350 can be a keyboard, touchscreen, mouse, track ball, voice input, or other device capable of acting as a user interface to allow a user in interact with the UE 116. For example, the input device 350 can include voice recognition processing, thereby allowing a user to input a voice command. In another example, the input device 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme.

The processor 340 is also coupled to the display 355. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4:
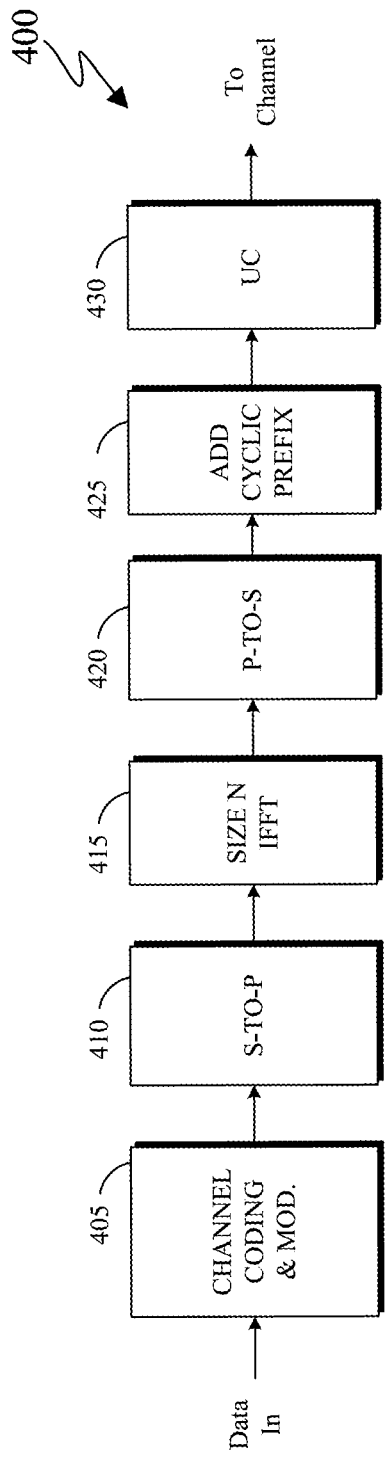
FIGS. 4 and 5 illustrate example wireless transmit and receive paths according to embodiments of the present disclosure.
Figure 5:
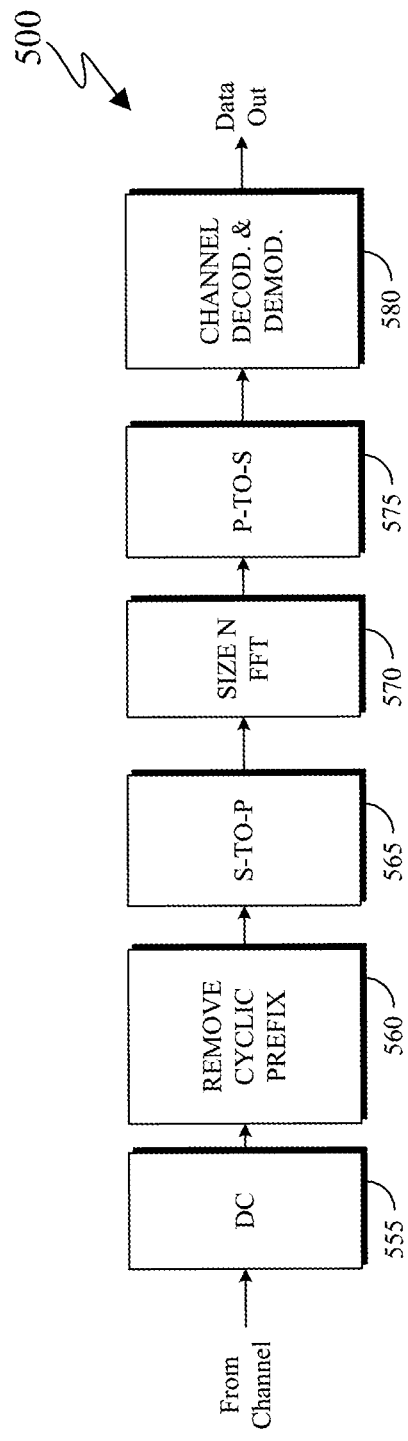

FIG. 4 and FIG. 5 illustrate example wireless transmit and receive paths according to this disclosure. In the following description, a transmit path 400, of FIG. 4, may be described as being implemented in a BS (such as the BS 102), while a receive path 500, of FIG. 5, may be described as being implemented in a UE (such as a UE 116). However, it may be understood that the receive path 500 can be implemented in a BS and that the transmit path 400 can be implemented in a UE. In some embodiments, the receive path 500 is configured to support conditions for transmission of acknowledgment information as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols. The serial-to-parallel block 410 converts (such as de-multiplexes) the serial modulated symbols to parallel data in order to generate N parallel symbol streams, where N is the IFFT/FFT size used in the BS 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the BS 102 arrives at the UE 116 after passing through the wireless channel, and reverse operations to those at the BS 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the BSs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-118. Similarly, each of UEs 111-118 may implement the transmit path 400 for transmitting in the uplink to the BSs 101-103 and may implement the receive path 500 for receiving in the downlink from the BSs 101-103.

Furthermore, each of UEs 111-119 may implement a transmit path 400 for transmitting in the sidelink to another one of UEs 111-119 and may implement a receive path 500 for receiving in the sidelink from another one of UEs 111-119.

Each of the components in FIG. 4 and FIG. 5 can be implemented using hardware or using a combination of hardware and software/firmware. As a particular example, at least some of the components in FIGS. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

In the following, an italicized name for a parameter indicates that the parameter is provided by higher layers.

A unit for downlink (DL) signaling or for uplink (UL) signaling on a cell is referred to as a slot and can include one or more symbols. A bandwidth (BW) unit is referred to as a resource block (RB). One RB includes a number of sub-carriers (SCs). For example, a slot can have duration of one millisecond and an RB can have a bandwidth of 180 kHz and include 12 SCs with inter-SC spacing of 15 kHz. A sub-carrier spacing (SCS) can be determined by a SCS configuration $\mu$ as $2^{\mu} \cdot 15$ kHz. A unit of one sub-carrier over one symbol is referred to as resource element (RE). A unit of one RB over one symbol is referred to as physical RB (PRB).

In certain embodiments, DL signals include data signals conveying information content, control signals conveying DL control information (DCI), and reference signals (RS) that are also known as pilot signals. A gNB (such as the BS 102) transmits data information or DCI through respective physical DL shared channels (PDSCHs) or physical downlink control channels (PDCCHs). A PDSCH or a PDCCH can be transmitted over a variable number of slot symbols including one slot symbol. A PDCCH transmission is over a number of control channel elements (CCEs) from a predetermined set of numbers of CCEs referred to as CCE aggregation level. A PDSCH transmission is scheduled by a DCI format or is semi-persistently scheduled (SPS) as configured by higher layers and activated by a DCI format. A PDSCH reception by a UE provides one or more transport blocks (TBs), wherein a TB is associated with a HARQ process that is indicated by a HARQ process number field in a DCI format scheduling the PDSCH reception or activating a SPS PDSCH reception. A TB transmission can be an initial one or a retransmission as identified by a new data indicator (NDI) field in the DCI format scheduling a PDSCH reception that provides a TB retransmission for a given HARQ process number. A DCI format can be a DCI format 1_0, a DCI format 1_1, or a DCI format 1_2 as described in REF2.

A gNB (such as the BS 102) transmits one or more of multiple types of RS including channel state information RS (CSI-RS) and demodulation RS (DM-RS)—see also REF1. A CSI-RS is primarily intended for UEs to perform measurements and provide channel state information (CSI) to a gNB. For channel measurement or for time tracking, non-zero power CSI-RS (NZP CSI-RS) resources are used. For interference measurement reports (IMRs), CSI interference measurement (CSI-IM) resources are used (see also REF3). The CSI-IM resources can also be associated with a zero power CSI-RS (ZP CSI-RS) configuration. A UE (such as the UE 116) can determine CSI-RS reception parameters through DL control signaling or higher layer signaling, such as RRC signaling from a gNB (see also REF6). A DM-RS is typically transmitted only within a BW of a respective PDCCH or PDSCH and a UE can use the DM-RS to demodulate data or control information.

In certain embodiments UL signals also include data signals conveying information content, control signals conveying UL control information (UCI), DM-RS associated with data or UCI demodulation, sounding RS (SRS) enabling a gNB (such as the BS 102) to perform UL channel measurement, and a random access (RA) preamble enabling a UE to perform random access (see also REF1). A UE transmits data information or UCI through a respective physical UL shared channel (PUSCH) or a PUCCH. A PUSCH or a PUCCH can be transmitted over a variable number of symbols in a slot including one symbol. When a UE simultaneously transmits data information and UCI, the UE can multiplex both in a PUSCH or, depending on a UE capability, transmit both a PUSCH with data information and a PUCCH with UCI at least when the transmissions are on different cells. A DCI format scheduling a PUSCH transmission can be a DCI format 0_0, a DCI format 0_1, or a DCI format 0_2 as described in REF2.

UCI includes HARQ-ACK information, indicating correct or incorrect decoding of TBs or of code block groups (CBGs) in a PDSCH, scheduling request (SR) indicating whether a UE has data in its buffer to transmit, and CSI reports enabling a gNB to select appropriate parameters for PDSCH/TB or PDCCH/DCI format transmissions to a UE. A UE transmits a PUCCH on a primary cell of a cell group. HARQ-ACK information is either a positive acknowledgement (ACK) when a TB decoding is correct or a negative acknowledgement (NACK) when a TB decoding is incorrect. An ACK can be represented by a binary '1' value and a NACK can be represented by a binary '0' value. A UE multiplexes HARQ-ACK information in a slot indicated by a value of PDSCH-to-HARQ_feedback timing indicator field in the DCI format, from a set of slot timing values $K_1$, or indicated by higher layers.

UL RS includes DM-RS and SRS. DM-RS is typically transmitted within a BW of a respective PUSCH or PUCCH. A gNB (such as the BS 102) can use a DM-RS to demodulate information in a respective PUSCH or PUCCH. SRS is transmitted by a UE to provide a gNB with an UL CSI and, for a TDD system, to also provide a precoder matrix indicator (PMI) for DL transmission. Further, as part of a random access procedure or for other purposes, a UE can transmit a physical random access channel (PRACH).

DL receptions and UL transmissions by a UE can be configured to occur in a corresponding DL bandwidth part (BWP) and UL BWP. A DL/UL BWP is smaller than or equal to a DL/UL bandwidth of a serving cell. Multicast (or groupcast) PDSCH receptions can occur in a common frequency region for a group of UEs, wherein the common frequency region is within an active DL BWP for each UE from the group of UEs. DL transmissions from a gNB and UL transmissions from a UE can be based on an OFDM waveform including a variant using DFT precoding that is known as DFT-spread-OFDM (see also REF1).

Figure 6:
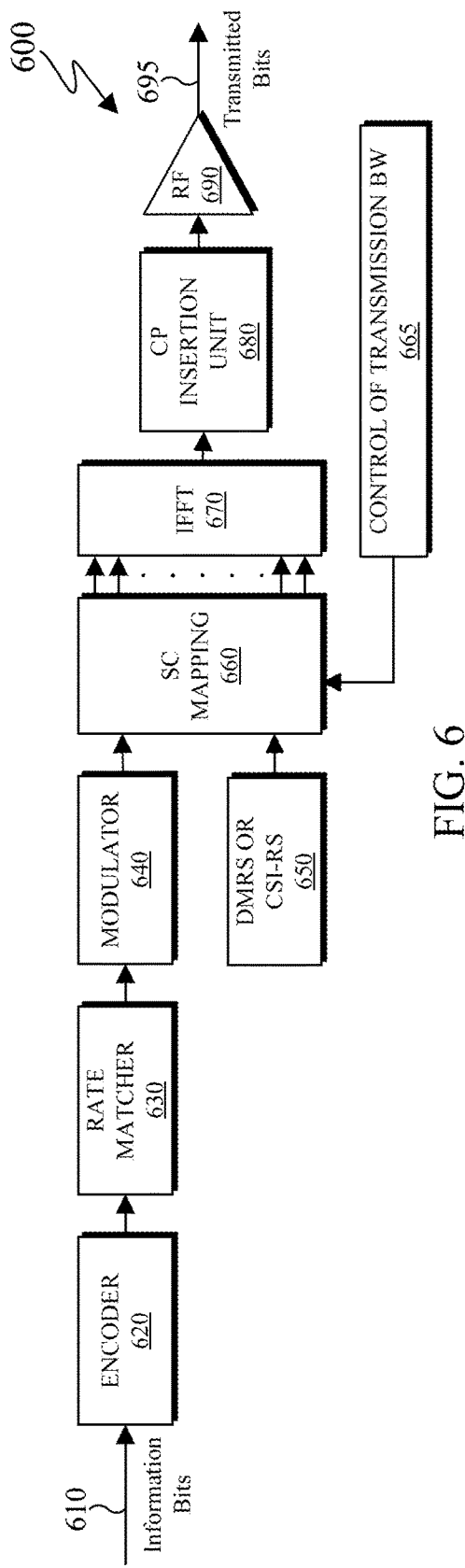
FIG. 6 illustrates a block diagram of an example transmitter structure using orthogonal frequency division multiplexing (OFDM) according to embodiments of the present disclosure.
Figure 7:
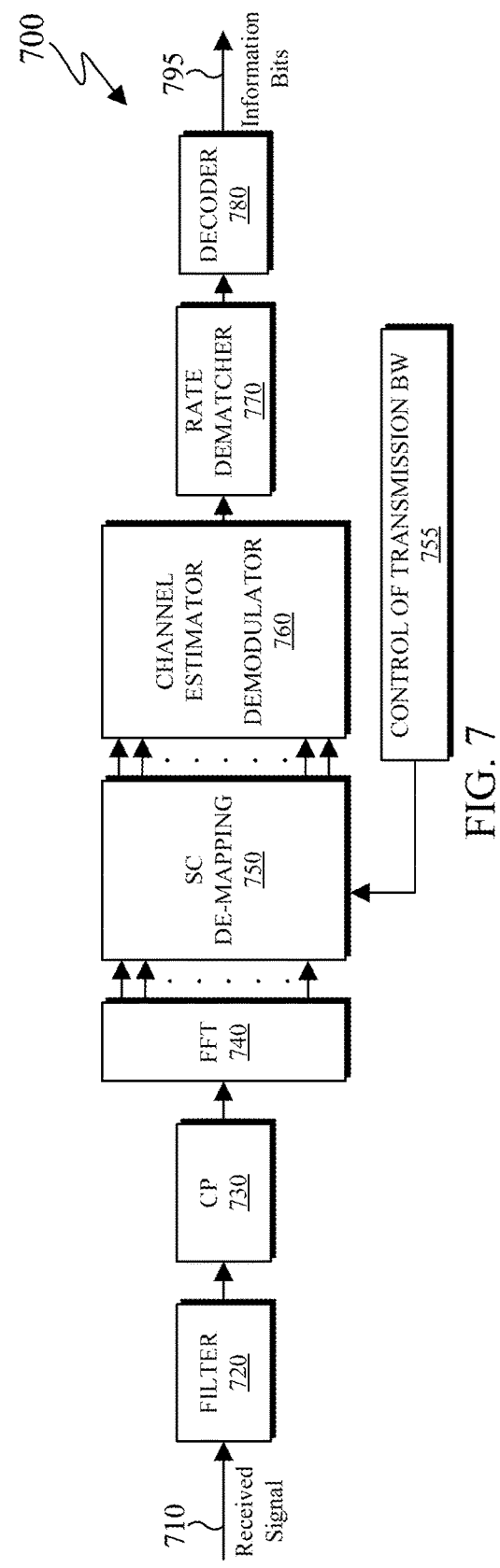
FIG. 7 illustrates a block diagram of an example receiver structure using OFDM according to embodiments of the present disclosure.

FIG. 6 illustrates a block diagram 600 of an example transmitter structure using OFDM according to embodiments of the present disclosure. FIG. 7 illustrates a block diagram 700 of an example receiver structure using OFDM according to embodiments of the present disclosure.

The transmitter structure as shown in the block diagram 600 and the receiver structure as shown in the block diagram 700 can be similar to the RF transceivers 210a-210n of FIG. 2 and the RF transceiver 310 of FIG. 3. The example block diagram 600 of FIG. 6 and the block diagram 700 of FIG. 7 are for illustration only and other embodiments can be used without departing from the scope of the present disclosure.

As illustrated in the block diagram 600, information bits 610, such as DCI bits or data bits, are encoded by encoder 620, rate matched to assigned time/frequency resources by rate matcher 630 and modulated by modulator 640. Subsequently, modulated encoded symbols and demodulation reference signal (DM-RS) or CSI-RS 650 are mapped to SCs by SC mapping unit 660 with input from BW selector unit 665, an IFFT is performed by filter 670, a cyclic prefix (CP) is added by CP insertion unit 680, and a resulting signal is filtered by filter 690 and transmitted by a radio frequency (RF) unit as transmitted bits 695.

As illustrated in the block diagram 700, a received signal 710 is filtered by filter 720, a CP removal unit 730 removes a CP, a filter 740 applies a fast FFT, SCs de-mapping unit 750 de-maps SCs selected by BW selector unit 755, received symbols are demodulated by a channel estimator and a demodulator unit 760, a rate de-matcher 770 restores a rate matching, and a decoder 780 decodes the resulting bits to provide information bits 790.

In certain embodiments, a UE (such as the UE 116) may need to report HARQ-ACK information in response to correct or incorrect decoding of a DCI format together with HARQ-ACK information in response to correct of incorrect decoding of TBs. For example, the HARQ-ACK information for a decoding of a DCI format can be for a DCI format indicating an SPS PDSCH release or for a DCI format indicating a dormant/non-dormant BWP for a cell from a group of cells, and so on. A UE can also be configured to report HARQ-ACK information for a configured number of CBGs per TB as described in REF3. A HARQ-ACK information report can be based on one of several codebook types such as a Type-1 HARQ-ACK codebook, or a Type-2 HARQ-ACK codebook, or a Type-3 HARQ-ACK codebook as described in REF3.

A serving gNB (such as the BS 102) can provide by higher layer signaling to a UE a number of PUCCH resource sets for the UE to determine a PUCCH resource set and a PUCCH resource from the PUCCH resource set for transmission of a PUCCH with HARQ-ACK information as described in REF3. To enable flexible allocation of PUCCH resources, a PUCCH resource indicator (PRI) field, with fixed or configurable size, can be included in a DCI format scheduling a PDSCH reception and a UE can then determine a PUCCH resource based on a value of the PRI field. The UE determines a PUCCH resource based on a value of the PRI field in a last DCI format that the UE correctly decodes and the UE generates corresponding HARQ-ACK information that is included in a PUCCH transmission using the PUCCH resource. The last DCI format is provided by a PDCCH reception that starts after all other PDCCH receptions providing DCI formats with corresponding HARQ-ACK information multiplexed in a same PUCCH. In case of multiple PDCCH receptions that start at a same symbol and provide DCI formats scheduling PDSCH receptions on respective multiple cells, the last PDCCH reception is the one corresponding to a cell from the multiple cells with a largest cell index as described in REF3. In case the DCI formats indicate a priority for the HARQ-ACK information, the last DCI format is among DCI formats indicating a same priority.

In certain embodiments, a PDSCH reception can be only by a single UE and is then referred to as unicast PDSCH reception or can be by a group of UEs and is then referred to as multicast (or groupcast) PDSCH reception. The determination can be based on a radio network temporary identifier (RNTI) used to scramble a cyclic redundancy check (CRC) of a DCI format scheduling the PDSCH reception or activating SPS PDSCH receptions. For unicast PDSCH receptions, the RNTI can be a cell-RNTI (C-RNTI), a configured scheduling (CS-RNTI) or a modulation and coding scheme (MCS)-C-RNTI. For multicast PDSCH receptions, the RNTI can be a group RNTI (G-RNTI) or a G-CS-RNTI. HARQ-ACK information in response to unicast PDSCH receptions or in response to DCI formats with CRC scrambled by C-RNTI, CS-RNTI, or MCS-C-RNTI (unicast DCI formats) is referred to as unicast HARQ-ACK information and, together with SR or CSI, can be referred to as unicast UCI. HARQ-ACK information in response to multicast PDSCH receptions or in response to DCI formats with CRC scrambled by G-RNTI, G-CS-RNTI (multicast DCI formats) is referred to as multicast HARQ-ACK information.

A UE (such as the UE 116) can be configured to receive both unicast PDSCHs and multicast PDSCHs. The UE can identify whether a PDSCH reception is a unicast one or a multicast one based on the DCI format scheduling the PDSCH reception or based on an indication by higher layers when the PDSCH reception is not scheduled by a DCI format. For example, a DCI format scheduling a multicast PDSCH reception uses a G-RNTI and can have a same size as a DCI format 1_0 or, in general as a DCI format with CRC scrambled by a C-RNTI, or as a DCI format 2_x, where for example x=0, . . . 6, as they are described in REF2. More than one DCI formats with respective different sizes can be used to schedule multicast PDSCH receptions or to activate/release multicast SPS PDSCH receptions. Multicast PDCCH or PDSCH receptions by a UE are within a common frequency region (CFR) that is included in an active DL BWP of the UE. The following descriptions consider the active DL BWP and the active UL BWP for unicast signaling, and the CFR for multicast signaling.

A UE can be provided by higher layers a first information element (IE) PUCCH-Config providing parameters for a PUCCH transmission with unicast UCI, such as HARQ-ACK information associated with a DCI format with CRC scrambled by a C-RNTI, SR, or CSI, and a second IE PUCCH-Config providing parameters for a PUCCH transmission with HARQ-ACK information (and possibly CSI) associated with a DCI format with CRC scrambled by a G-RNTI. When the second IE PUCCH-Config is not provided, PUCCH resources associated with multicast HARQ-ACK information can also be provided by the first IE PUCCH-Config.

HARQ-ACK information reports from a UE can be disabled by higher layer signaling or by a DCI format scheduling an associated PDSCH reception or activation/release of SPS PDSCH receptions. The indication for disabling a HARQ-ACK information report can also be per RNTI, including per G-RNTI in case of multiple G-RNTIs, or per SPS PDSCH configuration.

When a UE would transmit a PUCCH in a slot that overlaps with a PUSCH transmission in a slot, the UE multiplexes the UCI in the PUSCH and does not transmit/drops the PUCCH. The UE does not expect to receive first PDCCHs providing first DCI formats that are associated with a HARQ-ACK information report in a PUCCH transmission in a slot, such as DCI formats that schedule PDSCH receptions, after the UE receives a second PDCCH providing a second DCI format scheduling a PUSCH transmission in the slot when the PUCCH transmission would overlap with the PUSCH transmission in the slot (a PDCCH or PDSCH reception ends at a last/latest symbol from a number of symbols of the PDCCH or PDSCH reception, respectively). That condition is required because a UE implementation in order to start the PUSCH preparation that includes HARQ-ACK multiplexing without waiting until the last possible slot where the UE can receive a PDCCH/DCI format from the first PDCCHs/DCI formats. A gNB can ensure a corresponding HARQ-ACK multiplexing timeline in a PUSCH for DCI formats associated only with the UE (unicast DCI formats), such as DCI formats with CRC scrambled by a C-RNTI. However, the gNB cannot ensure such HARQ-ACK multiplexing timeline for DCI formats scheduling multicast PDSCH receptions to a group of UEs (multicast DCI format), such as a DCI format scrambled with a G-RNTI.

When the UE is able to simultaneously transmit both PUCCH and PUSCH, UCI multiplexing in the PUSCH is not required. However, simultaneous PUCCH and PUSCH transmissions are associated with a requirement for a maximum power reduction (MPR) by the UE and, combined with a partitioning of the reduced maximum power for the PUSCH and PUCCH transmissions, can result to coverage loss or reduced reception reliability. Therefore, simultaneous PUCCH and PUSCH transmissions are not always beneficial and, in order to provide control to a gNB for enabling such transmissions while considering respective power requirements and a power headroom report (PHR) by the UE, enabling (or disabling) of simultaneous PUCCH and PUSCH transmissions can be indicated by a DCI format triggering the PUCCH transmission, such as a DCI format scheduling a PDSCH reception, or by a DCI format scheduling a PUSCH transmission. However, the gNB cannot indicate to the UE whether to multiplex UCI associated with the multicast PDSCH receptions in the PUSCH or in a PUCCH and simultaneously transmit the PUSCH and the PUCCH, by multicast DCI formats that the UE receives after a DCI format scheduling a PUSCH transmission.

In certain embodiments, a UE (such as the UE 116) does not expect to: (i) receive a first PDSCH and a second PDSCH that starts later than the first PDSCH, (ii) be indicated to transmit a first PUCCH with first HARQ-ACK information associated with the first PDSCH in a first slot and a second PUCCH with second HARQ-ACK information associated with the second PDSCH in a second slot, and (iii) the second slot to be before the first slot.

When a UE (such as the UE 116) is indicated by a first DCI format scheduling the first PDSCH to not transmit first HARQ-ACK information, the above set of conditions does not need to apply. For example, absence of the above set of conditions can be beneficial when the first PDSCH is multicast and the second PDSCH is unicast as a gNB can then schedule the second PDSCH and obtain a faster HARQ-ACK report based on an enhanced UE processing capability (UE processing capability 2) without being restricted by the multicast scheduling of the first PDSCH for which a HARQ-ACK information report needs to be based on a default processing capability that can be supported by all UEs (UE processing capability 1) and be provided with larger delay. Then, the only requirement is for the second PDSCH to be received after the first PDSCH by a time that is larger than or equal to the PDSCH processing time $T_{proc,1}$, as defined in REF4.

When a HARQ-ACK information report is for reception outcomes of TBs associated with different G-RNTIs, a PRI field in a multicast DCI format cannot offer a same functionality as for unicast PDSCH receptions. For example, a first UE can be configured to monitor PDCCH for detection of DCI formats associated with a first G-RNTI and a second G-RNTI while a second UE can be configured to monitor PDCCH for detection of DCI formats associated only with the second G-RNTI. When a HARQ-ACK codebook includes HARQ-ACK information associated with both the first and second G-RNTIs, a PRI value in the second DCI format cannot in general indicate an appropriate PUCCH resource for both the first UE and for the second UE as the first UE can have a larger HARQ-ACK codebook size than the second UE, at least for a Type-2 HARQ-ACK codebook.

In order to avoid a substantial increase in PUCCH overhead that would result when many or all UEs receiving a multicast PDSCH provide corresponding HARQ-ACK information in respective PUCCHs, a serving gNB (such as the BS 102) can configure a UEs to transmit corresponding PUCCHs only when the UE incorrectly decodes/receives at least one TB in a corresponding multicast PDSCH in order to indicate a respective NACK (NACK-only mode for HARQ-ACK reports). Corresponding PUCCH resources can be shared among UEs and the serving gNB can perform energy detection for each PUCCH resource to determine presence of a PUCCH transmission using the PUCCH resource and therefore determine a combination of correct or incorrect decoding/receptions for a number of TBs associated with the PUCCH resource from one or more UEs. A PUCCH format 0, or a PUCCH format 1 where all symbols are unmodulated (or, equivalently, use binary phase-shift keying (BPSK) modulation with a numeric bit value of 1), as described in REF1 and REF3, can be used for the PUCCH transmission and for the serving gNB to perform energy detection. A limitation for the functionality of a NACK-only mode for HARQ-ACK reports is for indicating a failure to detect a DCI format, such as a DCI format providing a release of semi-persistently scheduled (SPS) PDSCH receptions. It is therefore beneficial to expand the functionality of the NACK-only mode to include detection of a DCI format, such as for release of SPS PDSCH receptions, in order to simplify network planning and avoid a PUCCH resource overhead associated with configuration of dedicated PUCCH resources for each UE and enable a serving gNB to be informed whether any UE failed to detect the DCI format.

Therefore, embodiments of the present disclosure take into consideration that there is a need to determine a multiplexing procedure for multicast HARQ-ACK information in a PUSCH.

Embodiments of the present disclosure also take into consideration that there is a need to determine conditions for a simultaneous PUSCH transmission and PUCCH transmission with multicast HARQ-ACK information.

Embodiments of the present disclosure further take into consideration that there is a need to determine a timeline for a UE to start reception of a second PDSCH after the UE starts reception of a first PDSCH based on an indication by a DCI format for the UE to provide or not provide HARQ-ACK information in response to the first PDSCH reception.

Additionally, embodiments of the present disclosure take into consideration that there is need to define a procedure for a UE to determine a PUCCH resource for transmission of a PUCCH with HARQ-ACK information associated with multicast DCI formats.

Embodiments of the present disclosure also take into consideration that there is need to define procedures for enabling a UE to transmit PUCCH when the UE fails to detect a DCI format, such as a DCI format indicating release of multicast SPS PDSCH receptions.

It is noted that HARQ-ACK information can be for PDSCH receptions scheduled by DCI formats, or for SPS PDSCH receptions, or for a SPS PDSCH release, or for detection of a DCI format that does not schedule a PDSCH reception or a PUSCH transmission and instead provides an indication, such as for dormant/non-dormant active DL BWPs for the UE in a group of cells, or any other indication without scheduling a PDSCH reception.

In the following DCI formats and associated TBs in PDSCH receptions that have CRC scrambled by a C-RNTI/CS-RNTI are referred to as unicast DCI formats, or unicast TBs, or unicast PDSCHs, and associated HARQ-ACK information/codebooks is referred to as unicast HARQ-ACK information/codebooks. DCI formats and associated TBs in PDSCH receptions that have CRC scrambled by a G-RNTI/G-CS-RNTI are referred to as multicast DCI formats, or multicast TBs, or multicast PDSCHs, and associated HARQ-ACK information/codebooks is referred to as multicast HARQ-ACK information/codebooks.

In the following, HARQ-ACK codebooks are considered for multicast HARQ-ACK information associated with one or more G-RNTIs, or for unicast HARQ-ACK information, but the embodiments are applicable to any type of HARQ-ACK information associated with separate generation of corresponding HARQ-ACK codebooks.

The term "higher layers" is used to denote control information that a UE is provided in a PDSCH reception, such as RRC or a MAC control element (CE).

Embodiments of the present disclosure describe timeline-based multiplexing of multicast HARQ-ACK information in a PUSCH. That is, certain embodiments of the present disclosure describe a UE procedure for multiplexing multicast HARQ-ACK information in a PUSCH subject to a processing timeline. This is described in the following examples and embodiments, such as those of FIGS. 8 and 9.

Figure 8:
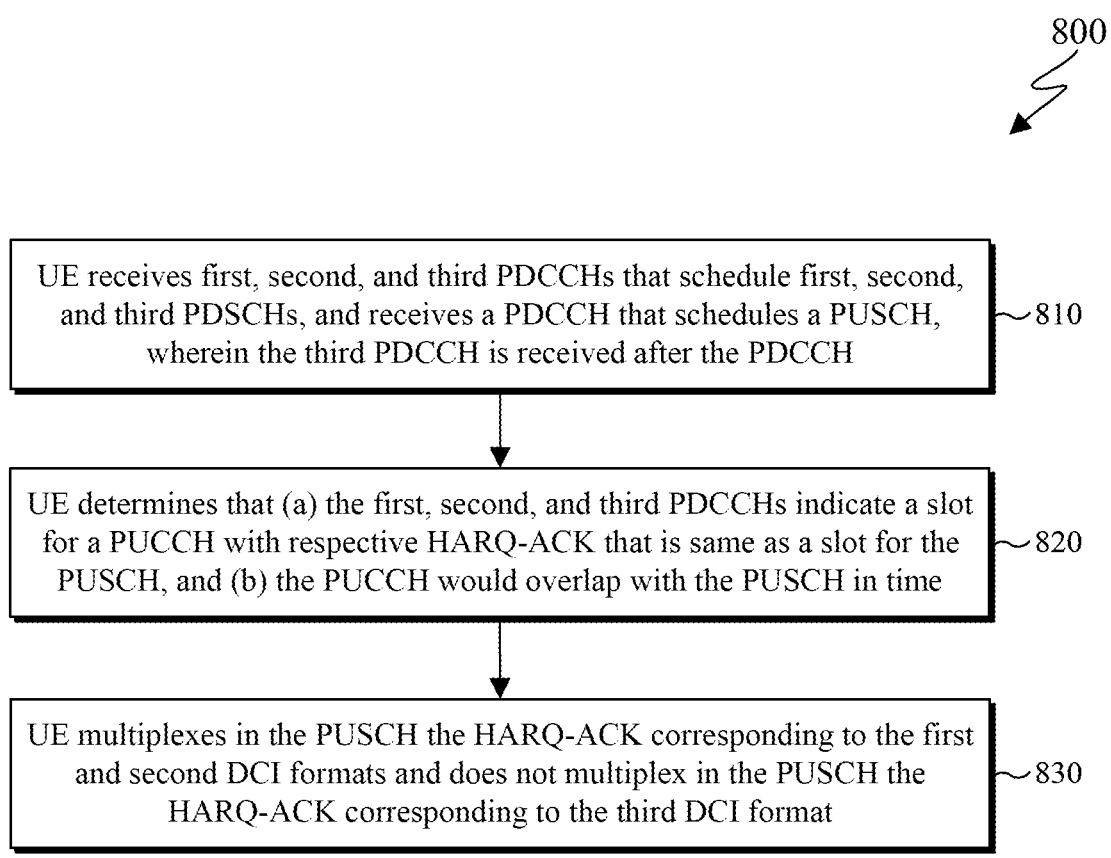
FIG. 8 illustrates example method for a UE to multiplex partial hybrid automatic repeat request (HARQ)—acknowledgement (ACK) information associated with physical downlink shared channel (PDSCH) receptions in a physical uplink shared channel (PUSCH) transmission according to embodiments of the present disclosure.
Figure 9:
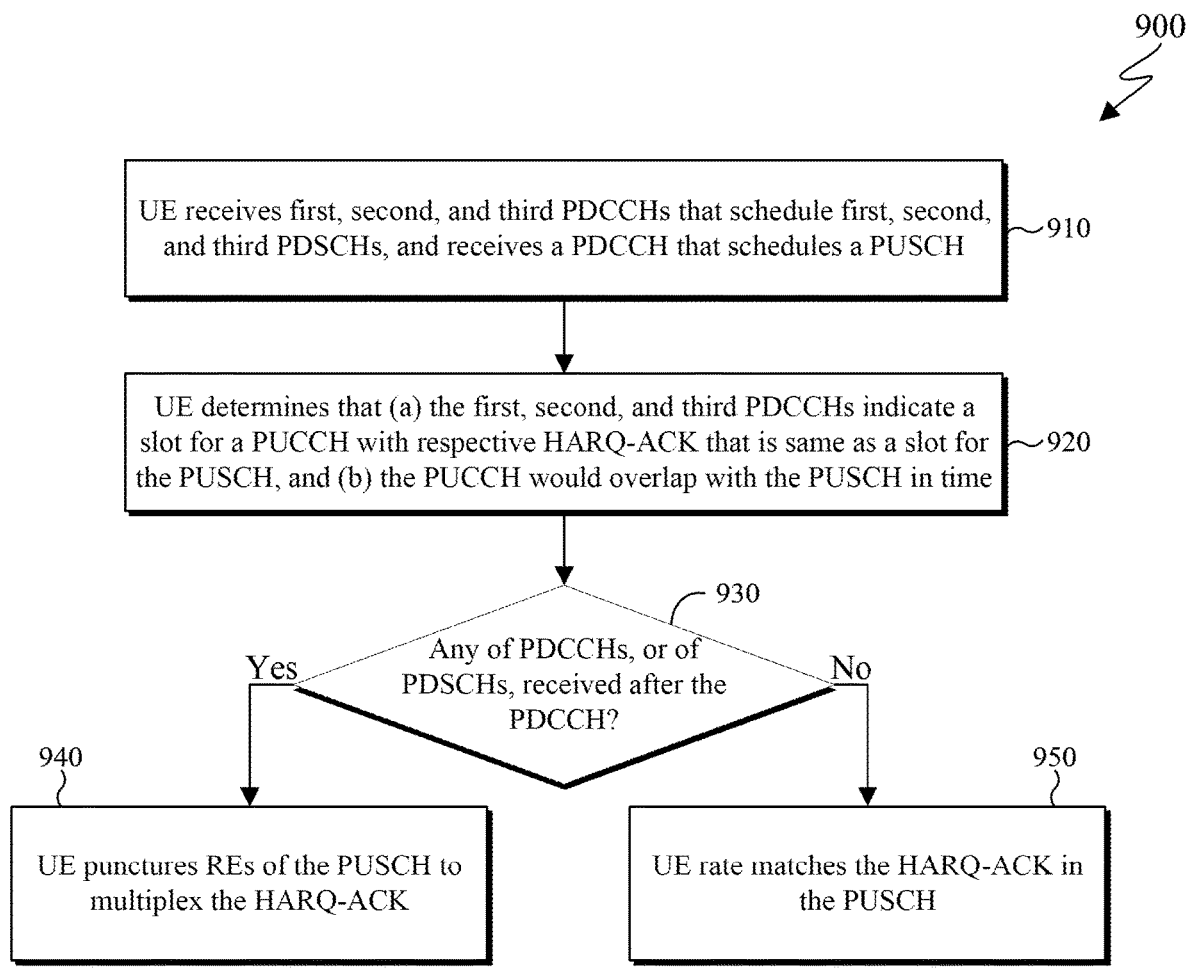
FIG. 9 illustrates example method for a UE to multiplex full HARQ-ACK information associated with PDSCH receptions in a PUSCH transmission according to embodiments of the present disclosure.

FIG. 8 illustrates example method 800 for a UE to multiplex partial HARQ-ACK information associated with PDSCH receptions in a PUSCH transmission according to embodiments of the present disclosure. FIG. 9 illustrates example method 900 for a UE to multiplex full HARQ-ACK information associated with PDSCH receptions in a PUSCH transmission according to embodiments of the present disclosure.

The steps of the method 800 of FIG. 8 and the method 900 of FIG. 9 can be performed by any of the UEs 111-119 of FIG. 1, such as the UE 116 of FIG. 3. The methods 800 and 900 are for illustration only and other embodiments can be used without departing from the scope of the present disclosure.

Due to the UE-group based scheduling of multicast PDSCH receptions, it is possible that a UE (such as the UE 116) receives a DCI format scheduling a PUSCH transmission in a slot prior to the UE receiving all multicast PDCCHs/DCI formats that schedule multicast PDSCH receptions and indicate a PUCCH transmission with corresponding multicast HARQ-ACK information in the slot. For example, for an UL-DL configuration that comprises repetitions of a pattern of DDDSU slots, wherein 'D' denotes a slot where transmissions are in the DL direction, U denotes a slot where transmissions are in the DL direction, and S denotes a slot where transmissions are both in the DL direction and in the UL direction (with more symbols of the slot typically allocated to transmission in the DL direction), the UE can receive a PDCCH/DCI format in the second slot that schedules a PUSCH transmission in the fifth slot and also receive multicast PDCCHs/DCI formats in the first, second, and third slots that respectively schedule multicast PDSCH receptions in the first, second, and third slots, and indicate a PUCCH transmission with corresponding multicast HARQ-ACK information in the fifth slot. In such case, the UE cannot multiplex all multicast HARQ-ACK information in the PUSCH.

In a first approach, a UE (such as the UE 116) multiplexes in a PUSCH only multicast HARQ-ACK information that is associated with multicast DCI formats that are provided in PDCCH receptions with last symbol that is not after a last symbol of a PDCCH reception providing a DCI format scheduling the PUSCH transmission, or in PDCCH receptions that do not start after the PDCCH reception providing the DCI format scheduling the PUSCH transmission. Alternatively, the UE multiplexes in the PUSCH only multicast HARQ-ACK information that is associated with multicast PDSCH receptions that do not end after a predetermined time prior to the start of the PUSCH transmission, such as a PUSCH preparation time $T_{proc,2}$ as described in REF3, wherein the predetermined time can depend on a SCS for the PDCCH/PDSCH receptions or the PUSCH transmission and can also depend on a UE capability.

For the previous example where the UE receives in the second slot a PDCCH providing a DCI format that schedules a PUSCH transmission in the fifth slot, and receives in the first, second, and third slots respective first, second, and third PDCCHs providing respective first, second, and third DCI formats that respectively schedule first, second, and third multicast PDSCH receptions in the first, second, and third slots and indicate a PUCCH transmission with corresponding multicast HARQ-ACK information in the fifth slot, the UE multiplexes in the PUSCH the HARQ-ACK information corresponding to the multicast PDCCHs/DCI formats the UE receives in the first and second slots (assuming that the second PDCCH does not end after the PDCCH). The UE does not multiplex in the PUSCH the HARQ-ACK information corresponding to the third multicast DCI format and the UE may not provide that HARQ-ACK information or the UE can include that HARQ-ACK information in a next PUCCH or PUSCH transmission.

The method 800, as illustrated in FIG. 8 describes an example procedure for a UE (such as the UE 116) to multiplex partial HARQ-ACK information associated with PDSCH receptions in a PUSCH transmission when last symbols for some of the PDCCHs scheduling the PDSCHs, or last symbols for some of the PDSCHs, are after a last symbol of a PDCCH scheduling the PUSCH according to the disclosure.

In step 810, a UE (such as the UE 116) receives first, second, and third PDCCHs that provide respective first, second, and third DCI formats scheduling respective first, second, and third PDSCH receptions. The UE also receives (in step 810) a PDCCH that provides a DCI format scheduling a PUSCH transmission, wherein the first and second PDCCHs are not received after the PDCCH and the third PDCCH is received after the PDCCH. In step 820, the UE determines that the first, second, and third DCI formats indicate a slot for a PUCCH transmission with respective HARQ-ACK information that is same as a slot for the PUSCH transmission, and that the PUCCH transmission would overlap with the PUSCH transmission in time. In step 830, the UE multiplexes in the PUSCH the HARQ-ACK information corresponding to the first and second DCI formats and does not multiplex in the PUSCH the HARQ-ACK information corresponding to the third DCI format.

In a second approach, a UE capability (such as for the UE 116) is defined for a UE to multiplex in a PUSCH transmission HARQ-ACK information that is associated with DCI formats in PDCCH receptions that end after a PDCCH reception providing a DCI format scheduling the PUSCH transmission. The UE capability can be defined as a minimum time $T_{proc,4}$ between an end of a PDCCH reception that provides a DCI format scheduling a PDSCH reception, or between an end of a PDSCH reception that provides a TB associated with the HARQ-ACK information, and a start symbol for the PUSCH transmission. For example, $T_{proc,4} = T_{proc,1} + T_{proc,2}$, wherein $T_{proc,1}$ is a PDSCH processing time and $T_{proc,2}$ is a PUSCH preparation time as described in REF3. $T_{proc,4}$ can also include a predetermined time offset in addition to $T_{proc,1}$ and $T_{proc,2}$. The UE capability can depend on a UE processing capability for PDSCH receptions, on a SCS for the PDCCH or PDSCH receptions or for the PUSCH transmission, on a number of TBs provided by a PDSCH reception, and so on.

In a third approach, the UE multiplexes in the PUSCH the HARQ-ACK information associated with all DCI formats, regardless of whether a reception time of a corresponding PDCCH is before or after a reception time of a PDCCH scheduling the PUSCH transmission, by puncturing a number of REs in the PUSCH wherein, for example, the UE can determine the number and location of REs as described in REF2. Puncturing of REs to multiplex HARQ-ACK information can apply when a multiplexing timeline for a HARQ-ACK codebook cannot be met such as when the UE receives at least one PDCCH associated with the HARQ-ACK codebook after the UE receives a PDCCH providing a DCI format scheduling the PUSCH transmission; otherwise, rate matching can apply (instead of puncturing).

The method 900, as illustrated in FIG. 9 describes an example procedure for a UE to multiplex full HARQ-ACK information associated with PDSCH receptions in a PUSCH transmission when last symbols for some of the PDCCHs scheduling the PDSCHs, or last symbols for some of the PDSCHs, are after a last symbol of a PDCCH scheduling the PUSCH according to the disclosure.

In step 910, a UE (such as the UE 116) receives first, second, and third PDCCHs that provide respective first, second, and third DCI formats scheduling respective first, second, and third PDSCH receptions. The UE in step 910 also receives a PDCCH that provides a DCI format scheduling a PUSCH transmission. In step 920, the UE determines that the first, second, and third DCI formats indicate a slot for a PUCCH transmission with respective HARQ-ACK information that is same as a slot for the PUSCH transmission, and that the PUCCH transmission would overlap with the PUSCH transmission in time. In step 930, the UE determines whether any of the PDCCHs, or whether any of the PDSCHs, are received after the PDCCH. When the UE receives any of the first, second, or third PDCCHs, or any of the first, second, or third PDSCHs, after the PDCCH (as determined in step 930), the UE in step 940 punctures REs of the PUSCH to multiplex the HARQ-ACK information. Otherwise, the UE in step 950 rate matches the HARQ-ACK information in the PUSCH.

In a fourth approach, a same timeline, defined by a time $T_{proc,2}$ as described in REF4, applies for multiplexing HARQ-ACK information in a PUSCH transmission and the UE multiplexes in the PUSCH transmission all HARQ-ACK information associated with PDCCH receptions after a PDCCH reception providing a DCI format scheduling the PUSCH transmission when the PDSCH receptions end at least $T_{proc,2}$ before the start of the PUSCH transmission.

In a fifth approach, the UE does not multiplex any of the HARQ-ACK information in the PUSCH, transmits the PUSCH, and does not transmit the PUCCH.

Although FIG. 8 illustrates the method 800 and the FIG. 9 illustrates the method 900 various changes may be made to FIGS. 8 and 9. For example, while the method 800 and the method 900 are shown as a series of steps, various steps could overlap, occur in parallel, occur in a different order, or occur multiple times. In another example, steps may be omitted or replaced by other steps. For example, steps of the method 800 and the method 900 can be executed in a different order.

Embodiments of the present disclosure describe the process of determining conditions for PDSCH receptions and PUCCH transmissions with HARQ-ACK information. That is, certain embodiments of the present disclosure describe a procedure for a UE (such as the UE 116) to receive PDSCHs when the UE is indicated by higher layers or is indicated by a DCI format scheduling a PDSCH reception, to not provide HARQ-ACK information for the PDSCH reception. This is described in the following examples and embodiments, such as those of FIG. 10.

Figure 10:
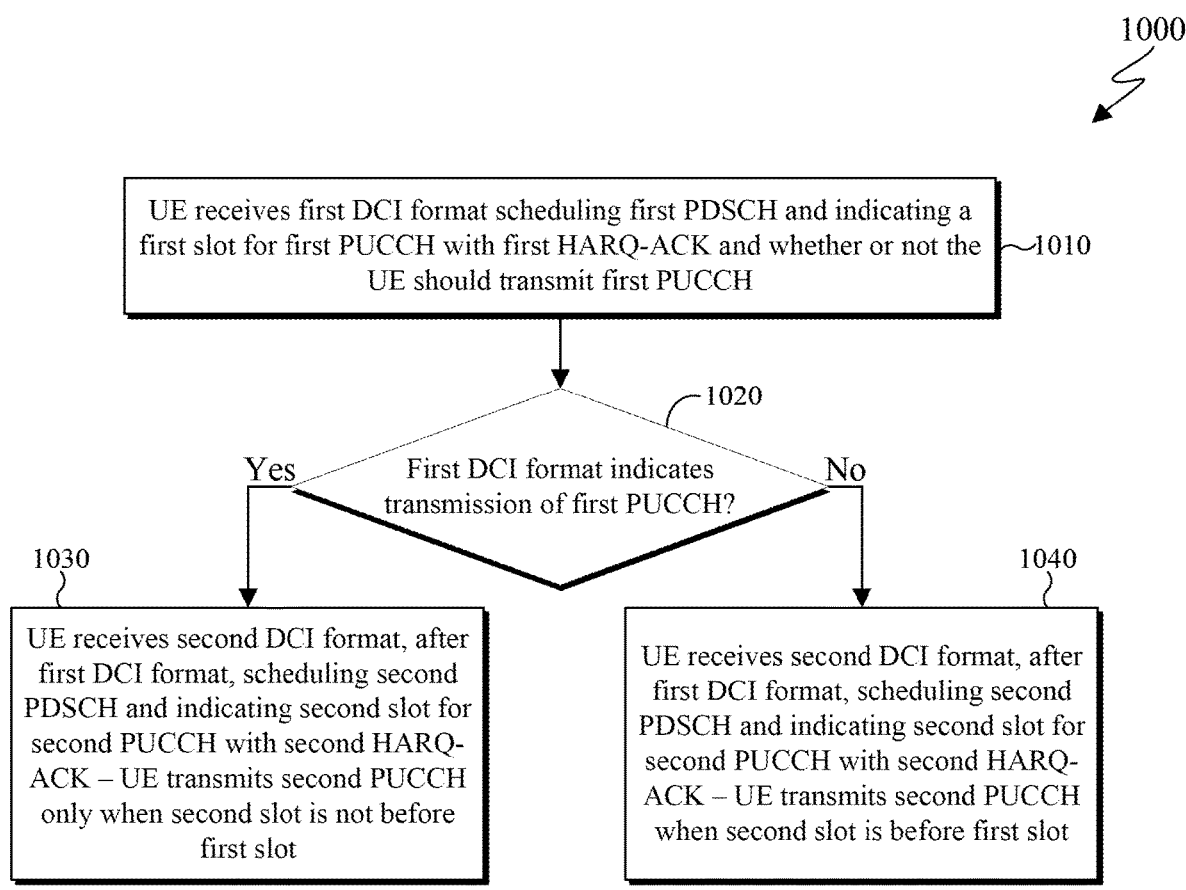
FIG. 10 illustrates example method for a for a UE to receive PDSCHs when the UE is indicated by a downlink control information (DCI) format scheduling a PDSCH reception to provide or to not provide HARQ-ACK information for the PDSCH reception according to embodiments of the present disclosure.

FIG. 10 illustrates example method 1000 for a for a UE to receive PDSCHs when the UE is indicated by a DCI format scheduling a PDSCH reception to provide or to not provide HARQ-ACK information for the PDSCH reception according to embodiments of the present disclosure. The steps of the method 1000 of FIG. 10 can be performed by any of the UEs 111-119 of FIG. 1, such as the UE 116 of FIG. 3. The method 1000 is for illustration only and other embodiments can be used without departing from the scope of the present disclosure.

When a UE is indicated by higher layers or is indicated by a DCI format scheduling a PDSCH reception, to not provide HARQ-ACK information for the PDSCH reception, the UE can ignore a first PDSCH-to-HARQ_feedback timing indicator field in a first DCI format scheduling a first PDSCH reception for the purpose of indicating a first slot for a first PUCCH transmission with first HARQ-ACK information associated with the first PDSCH reception. As the UE does not need to prepare a PUCCH to provide HARQ-ACK information, the only processing time the UE requires is the PDSCH processing time $T_{proc,1}$ and it is then possible for the UE to receive a second DCI format scheduling a second PDSCH reception and indicating a second slot, that is prior to the first slot, for a second PUCCH transmission with second HARQ-ACK information associated with the second PDSCH reception.

The method 1000, as illustrated in FIG. 10 describes an example procedure for a UE to receive PDSCHs when the UE is indicated by a DCI format scheduling a PDSCH reception to provide or to not provide HARQ-ACK information for the PDSCH reception according to the disclosure.

In step 1010, a UE (such as the UE 116) receives a first PDCCH that provides a first DCI format scheduling a first PDSCH reception and indicating a first slot for a first PUCCH transmission with corresponding first HARQ-ACK information and indicating whether or not the UE should transmit the PUCCH with the first HARQ-ACK information. In step 1020, the UE determines whether the first DCI format indicates transmission of the first PUCCH. When the first DCI format indicates transmission of the first PUCCH, and the UE receives a second PDCCH after the first PDCCH that provides a second DCI format scheduling a second PDSCH reception and indicating a second slot for a second PUCCH transmission with corresponding second HARQ-ACK information, the UE transmits the second PUCCH only when second slot is not before first slot (step 1030); otherwise, the UE transmits the second PUCCH regardless of whether or not the second slot is before the first slot (step 1040). A condition for the second PDSCH reception is to start $T_{proc,1}$ after the end of the first PDSCH reception. The first PDSCH reception can be a multicast PDSCH reception and the second PDSCH reception can be a multicast or unicast PDSCH reception.

Although FIG. 10 illustrates the method 1000 various changes may be made to FIG. 10. For example, while the method 1000 is shown as a series of steps, various steps could overlap, occur in parallel, occur in a different order, or occur multiple times. In another example, steps may be omitted or replaced by other steps. For example, steps of the method 1000 can be executed in a different order.

Embodiments of the present disclosure describe a process of determining multiplexing UCI in PUSCH or in PUCCH. That is, certain embodiments of the present disclosure describe a procedure for a UE (such as the UE 116) to determine whether to multiplex UCI in a PUSCH, or whether to multiplex UCI in a PUCCH and transmit the PUCCH and the PUSCH, when the PUCCH and the PUSCH would overlap in time. This is described in the following examples and embodiments, such as those of FIGS. 11 and 12.

Figure 11:
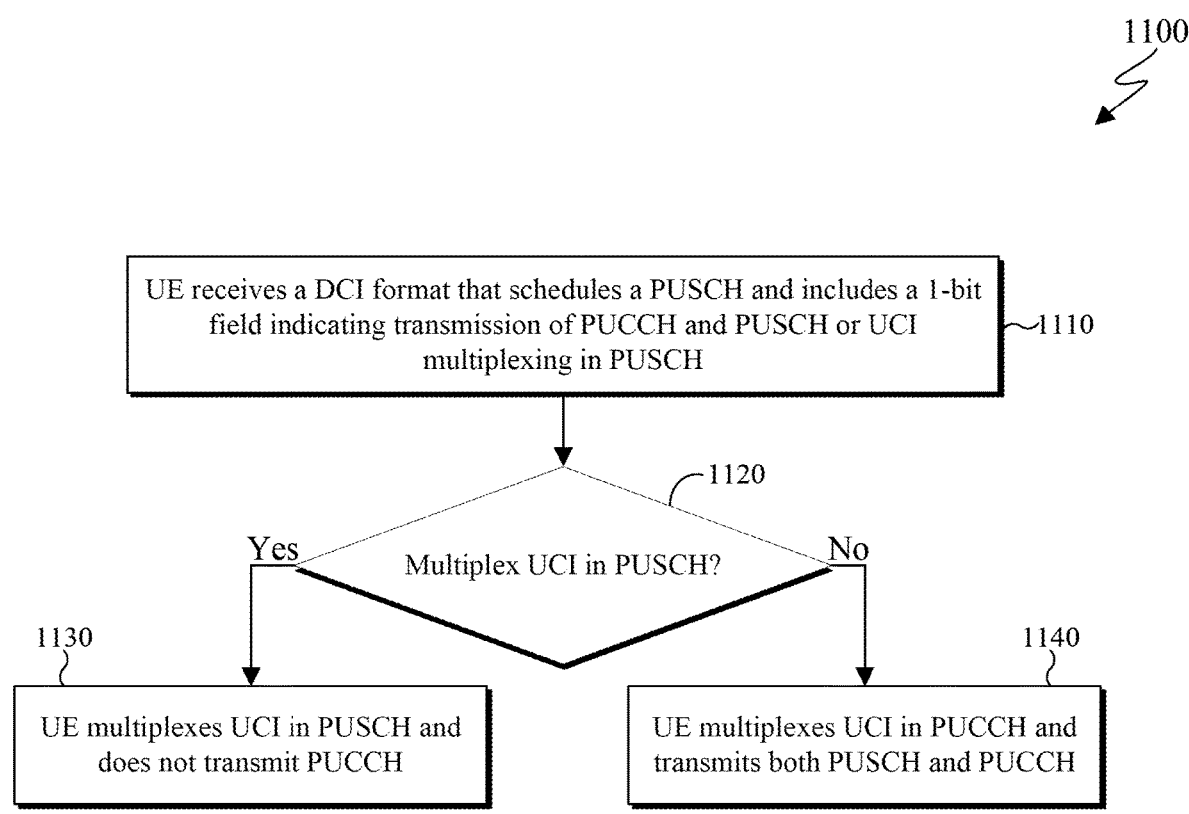
FIG. 11 illustrates example method for a UE to multiplex unlink control information (UCI) in a PUSCH or in a physical uplink control channel (PUCCH) when the PUSCH and PUCCH transmissions would overlap in time according to embodiments of the present disclosure.
Figure 12:
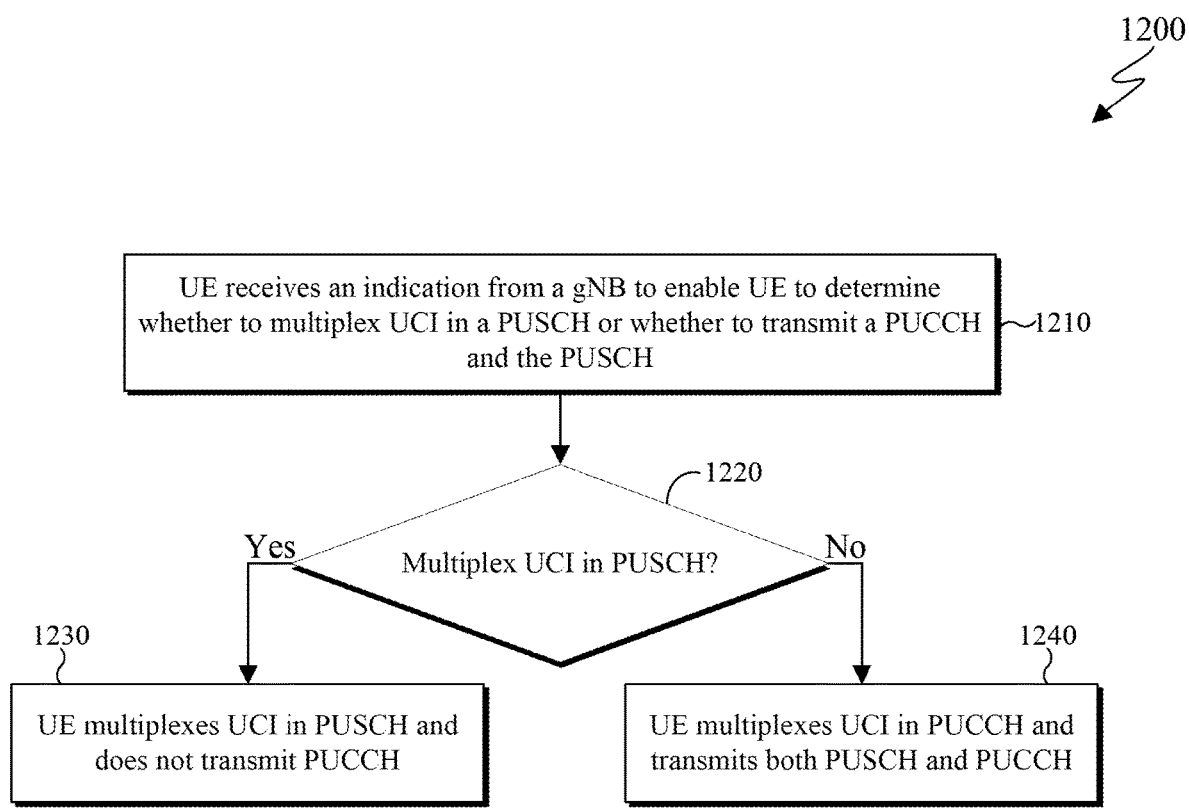
FIG. 12 illustrates example method for a to independently determine whether to multiplex UCI in a PUSCH or in a PUCCH when the PUSCH and PUCCH transmissions would overlap in time according to embodiments of the present disclosure.

FIG. 11 illustrates example method 1100 for a UE to multiplex UCI in a PUSCH or in a PUCCH when the PUSCH and PUCCH transmissions would overlap in time according to embodiments of the present disclosure. FIG. 12 illustrates example method 1200 for a to independently determine whether to multiplex UCI in a PUSCH or in a PUCCH when the PUSCH and PUCCH transmissions would overlap in time according to embodiments of the present disclosure.

The steps of the method 1100 of FIG. 11 and the method 1200 of FIG. 12 can be performed by any of the UEs 111-119 of FIG. 1, such as the UE 116 of FIG. 3. The methods 1100 and 1200 are for illustration only and other embodiments can be used without departing from the scope of the present disclosure.

In certain embodiments, simultaneous PUCCH and PUSCH transmissions can be beneficial when a desired reliability for multiplexing UCI, such as HARQ-ACK information, in the PUSCH cannot be achieved, for example because there can be ambiguity in the HARQ-ACK information payload. For example, when a UE needs to provide HARQ-ACK information for multiple G-RNTIs, an error in the HARQ-ACK payload determination can occur when the UE fails to detect a last DCI format for any of the G-RNTIs and an UL DCI format scheduling the PUSCH transmission does not include a downlink assignment index (DAI) field for each G-RNTI. For example, unicast and multicast services can be associated with different priorities and multiplexing of multicast HARQ-ACK information of a first priority in a PUSCH transmission of a second priority may not meet required reliability objectives or corresponding procedures may not be supported by a UE. Simultaneous PUCCH and PUSCH transmissions can be restricted on being on different cells and further restricted on being on different bands.

In a first approach, a UE multiplexes unicast HARQ-ACK information in the PUSCH, multiplexes multicast HARQ-ACK information in the PUCCH and transmits both PUSCH and PUCCH. The reverse multiplexing may also apply. The multiplexing of multicast HARQ-ACK information in the PUCCH can also be controlled by a serving gNB through an indication in a DCI format scheduling the PUSCH transmission. For example, the DCI format can include a 1-bit field that indicates whether the UE should multiplex multicast HARQ-ACK information in the PUCCH or in the PUSCH and, for the latter case, the UE does not transmit the PUCCH. The indication by the 1-bit field may also apply for unicast UCI, either based on configuration by higher layers, or based on the specifications of the system operation at least when the multicast HARQ-ACK information and the unicast UCI have a same priority.

The method 1100, as illustrated in FIG. 11, describes an example procedure for a UE to multiplex UCI in a PUSCH or in a PUCCH when the PUSCH and PUCCH transmissions would overlap in time according to the disclosure.

In step 1100, a UE (such as the UE 116) receives a DCI format that schedules a PUSCH transmission and includes a 1-bit field indicating whether the UE should simultaneously transmit a PUCCH and the PUSCH, or whether the UE should multiplex UCI in the PUSCH. In step 1120, the UE determines whether to multiplex UCI in the PUSCH, or whether to simultaneously transmit the PUCCH and the PUSCH, based on the indication. The indication can be applicable only for multicast HARQ-ACK information while the UE multiplexes unicast UCI in the PUSCH. When the indication is to multiplex UCI in the PUSCH (as determined in step 1120), the UE in step 1130 multiplexes the UCI in the PUSCH and does not transmit the PUCCH; otherwise, the UE in step 1140 multiplexes the UCI in the PUCCH and transmits both the PUSCH and the PUCCH.

In a second approach, for a configured grant PUSCH (CG-PUSCH) transmission, a UE can be indicated by higher layers whether to multiplex multicast HARQ-ACK information in the CG-PUSCH, or whether to multiplex multicast HARQ-ACK information in a PUSCH and transmit both the PUCCH and the CG-PUSCH, when the transmissions would overlap in time. The indication by higher layers can also apply for unicast UCI or the UE can be provided a separate indication by higher layers whether to multiplex unicast UCI in the PUCCH or in the CG-PUSCH (or, in general, in a PUSCH).

In a third approach, multiplexing of UCI in a PUSCH or PUCCH can be determined by a UE, for example based on whether or not the UE needs to reduce a power that is determined based on power control formula for any of the PUSCH or PUCCH transmission, when the UE would transmit both and the two transmissions would overlap in time. For example, when the UE does not need to reduce a power for the PUCCH transmission or for the PUSCH transmission, the UE can transmit both the PUCCH and the PUSCH; otherwise, the UE multiplexes UCI in the PUSCH. A serving gNB can determine whether or not the UE multiplexes UCI in the PUSCH based on determining an absence of a PUCCH reception. The serving gNB can demodulate the information in the PUSCH without delay and then determine how to process the information, based on a determination for whether or not the PUSCH includes UCI, after the serving gNB determines whether or not there is an associated PUCCH reception. The UE behavior to independently determine whether to multiplex UCI in the PUSCH or to transmit both the PUCCH and the PUSCH can be configured by the serving gNB. When the UE determines that a simultaneous PUCCH and PUSCH transmission would cause a power reduction for the transmission of the PUSCH or of the PUCCH, the UE can also include a PHR for simultaneous PUCCH and PUSCH transmissions in the PUSCH.

The method 1200, as illustrated in FIG. 12, describes an example procedure for a UE to independently determine whether to multiplex UCI in a PUSCH or in a PUCCH when the PUSCH and PUCCH transmissions would overlap in time according to the disclosure.

In step 1210, a UE (such as the UE 116) receives an indication from a serving gNB to enable a determination by the UE whether to multiplex UCI in a PUSCH or whether to transmit a PUCCH and the PUSCH when the PUSCH and PUCCH transmissions would overlap in time. In step 1220, the UE determines whether to multiplex UCI in a PUSCH based on a condition. For example, the condition can be a resulting reduction in a power determined according to a power control formula for the PUSCH transmission or for the PUCCH transmission. When the UE determines to multiplex the UCI in the PUSCH (as determined in step 1220), the UE in step 1230 multiplexes the UCI in the PUSCH and does not transmit the PUCCH; otherwise, the UE in step 1240 multiplexes the UCI in the PUCCH and transmits both the PUSCH and the PUCCH.

In a fourth approach, a determination by a UE to multiplex HARQ-ACK information in a PUSCH, or to transmit a PUSCH and the PUCCH when the two transmissions would overlap in time, can depend on a HARQ-ACK information mode based on an indication by higher layers or specifications of the system operation. For example, when the HARQ-ACK information mode is for the UE to transmit a PUCCH to provide HARQ-ACK information with ACK or NACK values, the UE multiplexes the HARQ-ACK information in the PUSCH; otherwise, when the HARQ-ACK mode is for the UE to transmit a PUCCH only when the UE needs to indicate at least one NACK value, the UE provides the HARQ-ACK information through the PUCCH and transmits both the PUCCH and the PUSCH.

Although FIG. 11 illustrates the method 1100 and the FIG. 12 illustrates the method 1200 various changes may be made to FIGS. 11 and 12. For example, while the method 1100 and the method 1200 are shown as a series of steps, various steps could overlap, occur in parallel, occur in a different order, or occur multiple times. In another example, steps may be omitted or replaced by other steps. For example, steps of the method 1100 and the method 1200 can be executed in a different order.

Embodiments of the present disclosure describe the processing of determining a PUCCH resource for a PUCCH transmission with HARQ-ACK information. That is, embodiments of the present disclosure describe a procedure for a UE to determine a PUCCH resource to provide HARQ-ACK information in response to multicast PDSCH receptions. This is described in the following examples and embodiments, such as those of FIG. 13.

Figure 13:
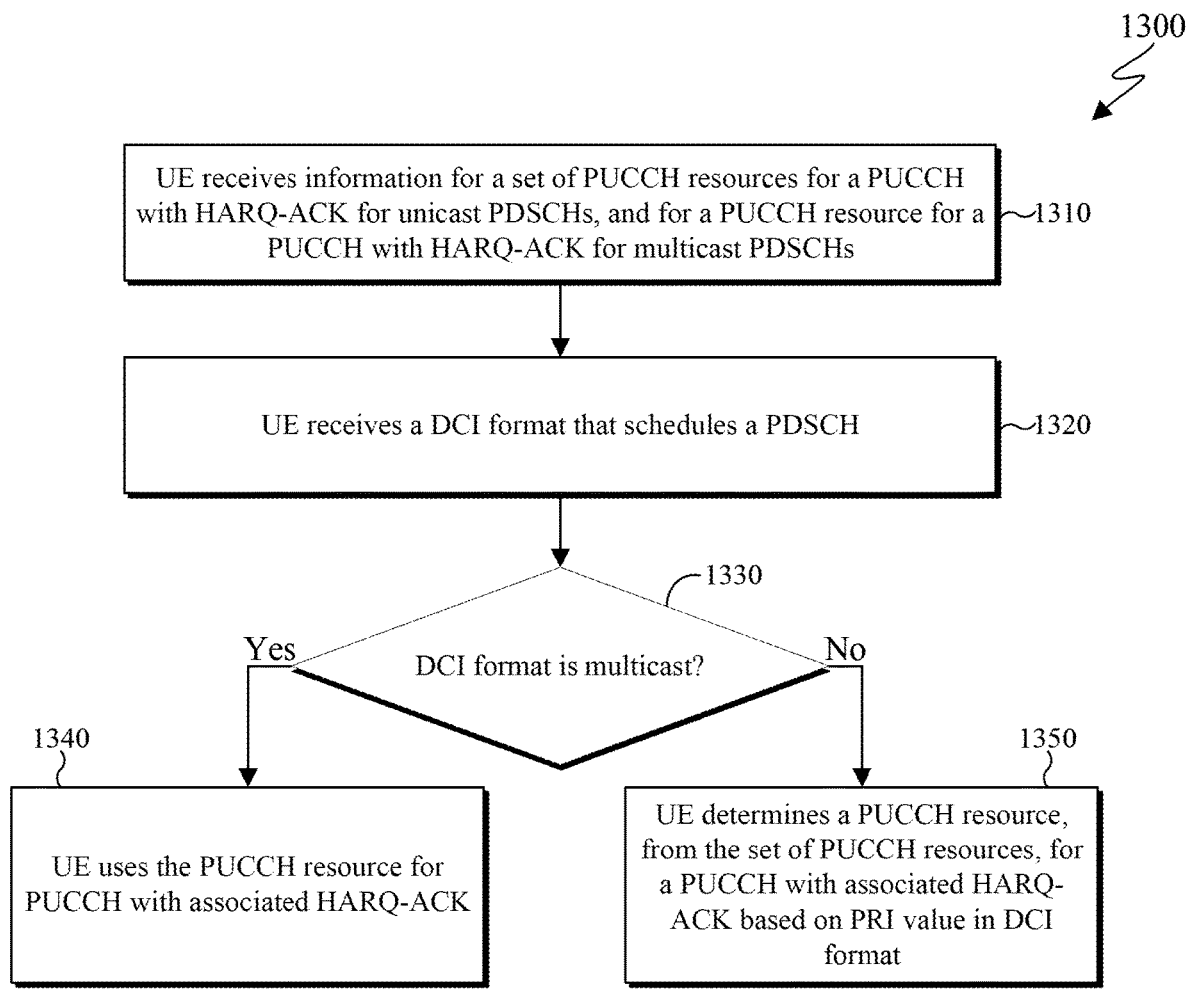
FIG. 13 illustrates an example method for a UE to determine a PUCCH resource for a PUCCH transmission that includes HARQ-ACK information associated with multicast PDSCH receptions or with unicast PDSCH receptions according to embodiments of the present disclosure.

FIG. 13 illustrates an example method for a UE to determine a PUCCH resource for a PUCCH transmission that includes HARQ-ACK information associated with multicast PDSCH receptions or with unicast PDSCH receptions according to embodiments of the present disclosure. The steps of the method 1300 of FIG. 13 can be performed by any of the UEs 111-119 of FIG. 1, such as the UE 116 of FIG. 3. The method 1300 is for illustration only and other embodiments can be used without departing from the scope of the present disclosure.

As a PRI field in DCI formats scheduling multicast PDSCH receptions cannot generally provide an intended functionality of indicating a PUCCH resource for every UE in a group of UEs receiving the multicast PDSCH to transmit a PUCCH with HARQ-ACK information corresponding to the multicast PDSCH receptions, a PUCCH resource can be indicated to a UE receiving the multicast PDSCHs in advance by higher layers. The PUCCH resource is applicable both when the UE receives multiple multicast PDSCHs associated with a same G-RNTI and when the UE receives multiple multicast PDSCHs associated with different G-RNTIs. When a minimum number of HARQ-ACK information bits associated with the PUCCH resource is smaller than a number of HARQ-ACK information bits corresponding to multicast PDSCH receptions by a UE, the UE can include additional information bits to achieve the minimum number of HARQ-ACK information bits. For example, when the minimum number of HARQ-ACK information bits is N=3 and the UE needs to report M=1 HARQ-ACK information bit, the UE can add/append N−M=2 HARQ-ACK information bits and provide N=3 HARQ-ACK information bits in the PUCCH. The additional N−M=2 HARQ-ACK information bits can have a predetermined value, such as '0' corresponding to NACK, at least when N is smaller than 12 and larger than 2 as a Reed-Muller code is then used and reception reliability for decoding of the HARQ-ACK information at a serving gNB can benefit from the presence of bits with predetermined values. Also, if the UE fails to detect latest/last DCI formats, a NACK value for a corresponding HARQ-ACK information is appropriate. The above procedure can be applicable at least for a Type-2 HARQ-ACK codebook.

When a UE is configured to transmit PUCCH only when the UE provides at least one NACK value for a corresponding multicast PDSCH reception, higher layers can also provide one or more PUCCH resources, depending on a number of multicast PDSCH receptions with associated HARQ-ACK information provided by a PUCCH transmission, and the UE can use a PUCCH resource from the one or more PUCCH resources for the PUCCH transmission, for example depending on a combination of ACK and NACK values that the UE provides. The PUCCH resource is determined based on a specified mapping of HARQ-ACK information values to corresponding PUCCH resources.

When a UE is provided PUCCH resources by higher layers to use for a PUCCH transmission with HARQ-ACK information corresponding to multicast PDSCH receptions, a PRI field in DCI formats scheduling the multicast PDSCH receptions can be omitted or ignored. A DCI format scheduling a unicast PDSCH reception to the UE can include a corresponding PRI field.

The method 1300, as illustrated in FIG. 13, describes an example procedure for a UE to determine a PUCCH resource for a PUCCH transmission associated with multicast PDSCH receptions or with unicast PDSCH receptions according to the disclosure.

In step 1310, a UE (such as the UE 116) receives information for a set of PUCCH resources for use by a PUCCH transmission with HARQ-ACK information associated with unicast PDSCH receptions and for a PUCCH resource for use by a PUCCH transmission with HARQ- ACK information associated with multicast PDSCH receptions. In step 1320, the UE receives a DCI format that schedules a PDSCH reception. In step 1330, the UE determines whether the DCI format is a multicast DCI format (CRC scrambled by a G-RNTI). When the DCI format is a multicast DCI format (as determined in step 1330), the UE in step 1340 uses the PUCCH resource for a PUCCH transmission with associated HARQ-ACK information based on the mapping of the HARQ-ACK information values to PUCCH resources; otherwise, the UE in step 1350 determines a PUCCH resource from the set of PUCCH resources for a PUCCH transmission with associated HARQ-ACK information based on a value of a PRI field in the DCI format.

Although FIG. 13 illustrates the method 1300 various changes may be made to FIG. 13. For example, while the method 1300 is shown as a series of steps, various steps could overlap, occur in parallel, occur in a different order, or occur multiple times. In another example, steps may be omitted or replaced by other steps. For example, steps of the method 1300 can be executed in a different order.

Embodiments of the present disclosure describe HARQ-ACK information in response to detection of DCI formats. That is, certain embodiments of the present disclosure describe a procedure for a UE (such as the UE 116) to provide NACK-only based HARQ-ACK information in response to detections of DCI formats. For example, DCI formats indicating activation/release of multicast SPS PDSCH receptions. This is described in the following examples and embodiments, such as those of FIG. 14.

Figure 14:
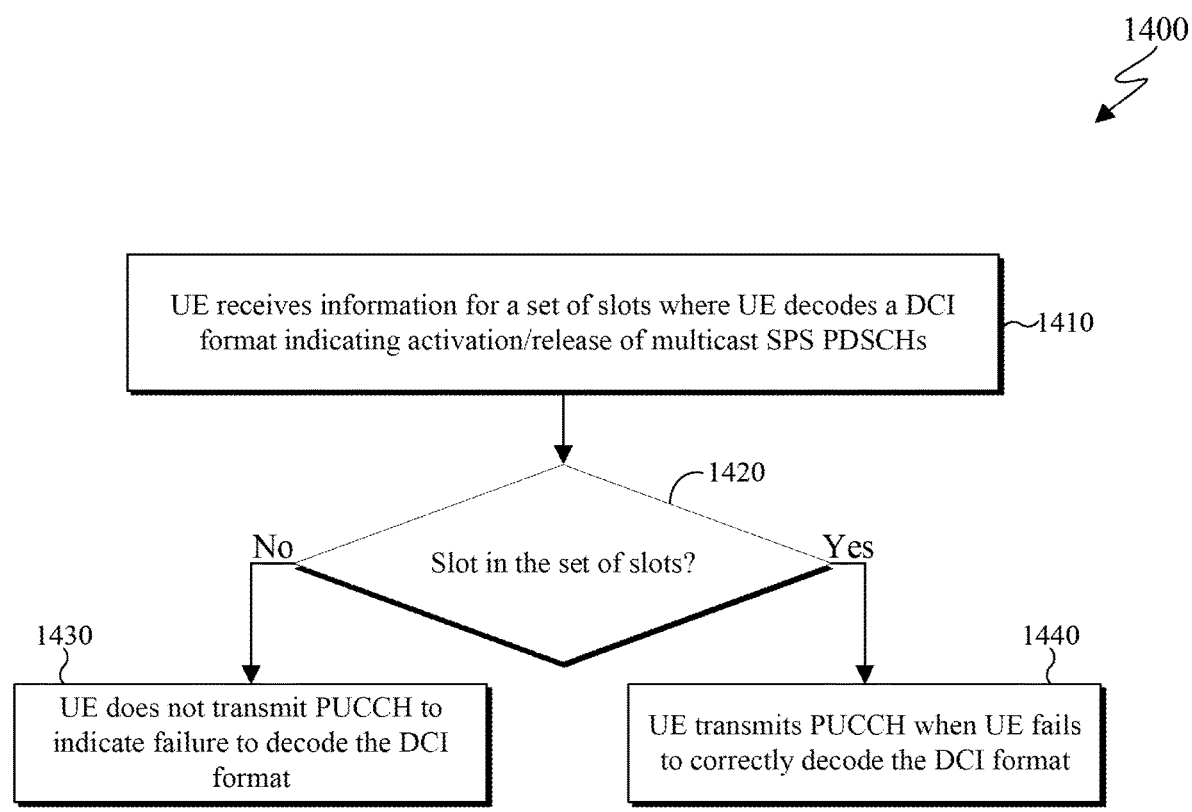
FIG. 14 illustrates an example method for a UE to provide negative acknowledgement (NACK)-only based HARQ-ACK information in response to a failure to decode a DCI format indicating activation/release of multicast semi-persistently scheduled (SPS) PDSCH receptions according to embodiments of the present disclosure.

FIG. 14 illustrates an example method for a UE to provide NACK-only based HARQ-ACK information in response to a failure to decode a DCI format indicating activation/release of multicast SPS PDSCH receptions according to embodiments of the present disclosure. The steps of the method 1400 of FIG. 14 can be performed by any of the UEs 111-119 of FIG. 1, such as the UE 116 of FIG. 3. The method 1400 is for illustration only and other embodiments can be used without departing from the scope of the present disclosure.

An important limitation for a usefulness of a NACK-only based HARQ-ACK reporting mode by a UE is that it is only applicable for indicating incorrect decoding of TBs and cannot indicate a failure to detect DCI formats by the UE, such as for release of multicast SPS PDSCH receptions. A serving gNB then needs to additionally support an ACK/NACK based HARQ-ACK reporting mode and provide corresponding PUCCH resources to each UE from a group of potentially hundreds of UEs that receive multicast SPS PDSCHs associated with one or more G-RNTIs or needs to disable HARQ-ACK information reports for SPS release from at least some UEs from the group of UEs.

In a first approach, a serving gNB provides separate configurations to a UE for enabling HARQ-ACK reports associated with multicast PDSCH receptions that are scheduled by DCI formats, and for enabling HARQ-ACK reports in response to a decoding outcome for a DCI format providing a release of multicast SPS PDSCH receptions. In the latter case, absence of a PUCCH reception in a corresponding PUCCH resource indicates failure by a UE to decode the DCI format and presence of the PUCCH reception indicates correct decoding (detection) by the UE of the DCI format for release of multicast SPS PDSCH receptions. To avoid an overhead associated with providing to each UE in a group of UEs a dedicated PUCCH resource for transmission of a PUCCH in response to detection of a DCI format indicating release of multicast SPS PDSCH receptions, the serving gNB can configure a UE with a NACK-only mode for HARQ-ACK reports associated with decoding outcomes of TBs and also configure the UE to not provide HARQ-ACK reports associated with a decoding outcome of a DCI format for release of multicast SPS PDSCH receptions. The latter configuration can be implicit by not supporting a NACK-only mode for HARQ-ACK report associated with a DCI format detection and by not providing to a UE a PUCCH resource for a PUCCH transmission in response to a correct decoding/detection of the DCI format indicating release of multicast SPS PDSCH receptions.

In a second approach, a UE is provided a set of slots and a PUCCH resource to transmit a PUCCH when the UE fails to correctly decode a DCI format indicating release of multicast SPS PDSCH receptions in a slot from the set of slots. For example, the set of slots can be defined by a pattern, such as a bitmap, having a periodicity, wherein the bitmap can correspond to a number of slots, such as 10 slots that repeat in time in blocks of 10 slots. A bitmap value of '0'/'1' can indicate no detection/detection for a DCI format indicating release of multicast SPS PDSCH receptions (or the reverse). For example, the set of slots can be defined by a periodicity and an offset, such as the first slot or the fifth slot every ten slots. For example, the UE can be provided a separate search space set for PDCCH receptions that provide a DCI format indicating release of multicast SPS PDSCH receptions and then the set of slots is determined according to the search space set and corresponds to the slots where the UE receives PDCCH for detection of the DCI format. A PUCCH resource for the PUCCH transmission can be common with a PUCCH resource for a PUCCH transmission in response to incorrect TB decoding or can be separately provided by the serving gNB to the UE.

The method 1400, as illustrated in FIG. 14, describes an example procedure for a UE to provide NACK-only based HARQ-ACK information in response to a failure to decode a DCI format indicating activation/release of multicast SPS PDSCH receptions according to the disclosure.

In step 1410, a UE (such as the UE 116) receives information for a set of slots where the UE decodes a DCI format indicating release of multicast SPS PDSCH receptions. The information can be separately provided or can be determined based on a dedicated search space set configuration for receptions of PDCCHs providing the DCI format. In step 1420, the UE determines whether a slot is in the set of slots. When the slot is not in the set of slots (as determined in step 1420), the UE in step 1430 does not transmit a PUCCH to indicate a failure to detect the DCI format; otherwise, when the UE fails to detect the DCI format, the UE transmits the PUCCH (step 1440).

Although FIG. 14 illustrates the method 1400 various changes may be made to FIG. 14. For example, while the method 1400 is shown as a series of steps, various steps could overlap, occur in parallel, occur in a different order, or occur multiple times. In another example, steps may be omitted or replaced by other steps. For example, steps of the method 1400 can be executed in a different order.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method for providing hybrid automatic repeat request acknowledgement (HARQ-ACK) information, the method comprising:
   receiving:
      a first physical downlink control channel (PDCCH) that schedules a transmission of a physical uplink shared channel (PUSCH) in a slot, and
      PDCCHs that schedule receptions of first multicast physical downlink shared channels (PDSCHs), respectively, wherein:
         a first number of the PDCCHs is not received after the first PDCCH, and
         a second number of the PDCCHs is received after the first PDCCH;
   determining that a transmission of a physical uplink control channel (PUCCH) to provide the HARQ-ACK information associated with receptions of multicast PDSCHs, that include the first multicast PDSCHs, would overlap in time with the PUSCH transmission in the slot; and
   transmitting the PUSCH, wherein:
      the PUSCH includes first HARQ-ACK information associated with the first number of PDCCHs, and
      the PUSCH does not include second HARQ-ACK information associated with the second number of PDCCHs.

2. The method of claim 1, wherein the second number of PDCCHs is received later than a PUSCH processing time prior to the PUSCH transmission.

3. The method of claim 1, wherein the second HARQ-ACK information is not included in a second PUCCH transmission or in a second PUSCH transmission in a second slot after the slot.

4. The method of claim 1, wherein there are no receptions of second PDCCHs, after the first PDCCH reception, that schedule receptions of unicast PDSCHs, respectively, when unicast HARQ-ACK information associated with the receptions of the unicast PDSCHs is to be provided by the PUCCH in the slot.

5. The method of claim 1, wherein:
   the first PDCCH reception provides a downlink control information (DCI) format that includes a field indicating whether the HARQ-ACK information is to be provided by the PUSCH or the PUCCH, and
   the field indicates that the HARQ-ACK information is to be provided by the PUSCH.

6. The method of claim 1, wherein:
   the multicast PDSCH receptions include an initial semi-persistently scheduled (SPS) PDSCH reception and a non-initial SPS PDSCH reception after activation of multicast SPS PDSCH receptions,
   the HARQ-ACK information for the initial multicast SPS PDSCH reception, from the multicast SPS PDSCH receptions, is reported according to a first reporting mode, and
   the HARQ-ACK information for the non-initial multicast SPS PDSCH reception, from the multicast SPS PDSCH receptions, is reported according to a second reporting mode.

7. The method of claim 6, further comprising:
   receiving information indicating whether to use the first or second reporting mode for reporting the HARQ-ACK information for the non-initial multicast SPS PDSCH reception,
   wherein the information indicates to use the second reporting mode.

8. A user equipment (UE) comprising:
   a transceiver configured to receive:
      a first physical downlink control channel (PDCCH) that schedules a transmission of a physical uplink shared channel (PUSCH) transmission in a slot, and
      PDCCHs that schedule receptions of first multicast physical downlink shared channels (PDSCHs), respectively, wherein:
         a first number of the PDCCHs is not received after the first PDCCH, and
         a second number of the PDCCHs is received after the first PDCCH;
   a processor operably coupled to the transceiver, the processor configured to determine that a transmission of a physical uplink control channel (PUCCH) to provide hybrid automatic repeat request acknowledgement (HARQ-ACK) information associated with receptions of multicast PDSCHs, that include the first multicast PDSCHs, would overlap in time with the PUSCH transmission in the slot,
   wherein the transceiver is further configured to transmit the PUSCH and wherein:
      the PUSCH includes first HARQ-ACK information associated with the first number of PDCCHs, and
      the PUSCH does not include second HARQ-ACK information associated with the second number of PDCCHs.

9. The UE of claim 8, wherein the second number of PDCCHs is received later than a PUSCH processing time prior to the PUSCH transmission.

10. The UE of claim 8, wherein the second HARQ-ACK information is not included in a second PUCCH transmission or in a second PUSCH transmission in a second slot after the slot.

11. The UE of claim 8, wherein there are no receptions of second PDCCHs, after the first PDCCH reception, that schedule receptions of unicast PDSCHs, respectively, when unicast HARQ-ACK information associated with the receptions of the unicast PDSCHs is to be provided by the PUCCH in the slot.

12. The UE of claim 8, wherein:
   the first PDCCH reception provides a downlink control information (DCI) format that includes a field indicating whether the HARQ-ACK information is to be provided by the PUSCH or the PUCCH, and
   the field indicates that the HARQ-ACK information is to be provided by the PUSCH.

13. The UE of claim 8, wherein:
   the multicast PDSCH receptions include an initial semi-persistently scheduled (SPS) PDSCH reception and a non-initial SPS PDSCH reception after activation of multicast SPS PDSCH receptions, the HARQ-ACK information for the initial multicast SPS PDSCH reception, from the multicast SPS PDSCH receptions, is reported according to a first reporting mode, and the HARQ-ACK information for the non-initial multicast SPS PDSCH reception, from the multicast SPS PDSCH receptions, is reported according to a second reporting mode.

14. The UE of claim 13, wherein:

the transceiver is further configured to receive information indicating whether to use the first or second reporting mode for reporting the HARQ-ACK information for the non-initial multicast SPS PDSCH reception, and the information indicates to use the second reporting mode.

15. A base station comprising:

a transceiver configured to transmit:
- a first physical downlink control channel (PDCCH) that schedules a reception of a physical uplink shared channel (PUSCH) in a slot, and
- PDCCHs that schedule transmissions of multicast physical downlink shared channels (PDSCHs), respectively, wherein:
  - a first number of the PDCCHs is not transmitted after the first PDCCH, and
  - a second number of the PDCCHs is transmitted after the first PDCCH;

a processor operably coupled to the transceiver, the processor configured to determine that a reception of a physical uplink control channel (PUCCH) to provide hybrid automatic repeat request acknowledgement (HARQ-ACK) information associated with transmissions of multicast PDSCHs, that include the first multicast PDSCHs, would overlap in time with the PUSCH reception in the slot, wherein the transceiver is further configured to receive the PUSCH and wherein:

the PUSCH includes first HARQ-ACK information associated with the first number of PDCCHs, and the PUSCH does not include second HARQ-ACK information associated with the second number of PDCCHs.

16. The base station of claim 15, wherein the second number of PDCCHs is received later than a PUSCH processing time prior to the PUSCH reception.

17. The base station of claim 15, wherein the second HARQ-ACK information is not included in a second PUCCH reception or in a second PUSCH reception in a second slot after the slot.

18. The base station of claim 15, wherein there are no transmissions of second PDCCHs, after the first PDCCH transmission, that schedule transmissions of unicast PDSCHs, respectively, when unicast HARQ-ACK information associated with the transmissions of the unicast PDSCHs is to be provided by the PUCCH in the slot.

19. The base station of claim 15, wherein:

the first PDCCH transmission provides a downlink control information (DCI) format that includes a field indicating whether the HARQ-ACK information is to be provided by the PUSCH or the PUCCH, and the field indicates that the HARQ-ACK information is to be provided by the PUSCH.

20. The base station of claim 15, wherein:

the multicast PDSCH transmissions include an initial semi-persistently scheduled (SPS) PDSCH transmission and a non-initial SPS PDSCH transmission after activation of multicast SPS PDSCH transmissions, the HARQ-ACK information for the initial multicast SPS PDSCH transmission, from the multicast SPS PDSCH transmissions, is reported according to a first reporting mode, and the HARQ-ACK information for the non-initial multicast SPS PDSCH transmission, from the multicast SPS PDSCH transmissions, is reported according to a second reporting mode.

* * * * *